US007351149B1

(12) United States Patent
Simon et al.

(10) Patent No.: US 7,351,149 B1
(45) **Date of Patent: *Apr. 1, 2008**

(54) MULTI-PERSON PARIMUTUEL BETTING GAMES BASED ON DETERMINATE SPORTING EVENTS

(75) Inventors: Burton Simon, Silverthorne, CO (US); Brian Van Duzee, 500 Hartford St., Boulder, CO (US) 80303

(73) Assignees: Simon Burton, Silverthorne, CO (US); Brian Van Duzee, Boulder, CO (US)

( * ) Notice: Subject to any disclaimer, the term of this patent is extended or adjusted under 35 U.S.C. 154(b) by 910 days.

This patent is subject to a terminal disclaimer.

(21) Appl. No.: 10/717,384

(22) Filed: Nov. 19, 2003

Related U.S. Application Data

(63) Continuation-in-part of application No. 09/767,418, filed on Jan. 23, 2001, now Pat. No. 7,172,508.

(51) Int. Cl.
*G06F 19/00* (2006.01)

(52) U.S. Cl. ............................ 463/42; 463/41; 463/25

(58) Field of Classification Search ..................... None
See application file for complete search history.

(56) References Cited

U.S. PATENT DOCUMENTS

| | | | |
|---|---|---|---|
| 4,429,877 | A | 2/1984 | Coppock |
| 4,540,174 | A | 9/1985 | Coppock |
| 4,592,546 | A | 6/1986 | Fascenda et al. |
| 5,283,734 | A | 2/1994 | Von Kohorn |
| 5,462,275 | A | 10/1995 | Lowe et al. |
| 5,683,090 | A | 11/1997 | Zeile et al. |
| 5,772,512 | A | 6/1998 | Chichester |
| 5,830,069 | A | 11/1998 | Soltesz et al. |
| 5,956,485 | A | 9/1999 | Perlman |
| 5,957,775 | A | 9/1999 | Cherry |
| 6,007,427 | A | 12/1999 | Wiener et al. |
| 6,015,345 | A | 1/2000 | Kail |
| 6,048,271 | A | 4/2000 | Barcelou |
| 6,102,797 | A | 8/2000 | Kail |
| 6,106,395 | A | 8/2000 | Begis |
| 6,120,376 | A | 9/2000 | Cherry |
| 6,126,543 | A | 10/2000 | Friedman |
| 6,287,199 | B1 | 9/2001 | McKeown |

*Primary Examiner*—Robert E. Pezzuto
*Assistant Examiner*—Omkar A. Deodhar
(74) *Attorney, Agent, or Firm*—Greenlee Winner and Sullivan, P.C.

(57) ABSTRACT

A parimutuel betting game based on events unfolding during a determinate sporting event, such as a trivia game, a principal objective being to acquire the largest number of betting tokens by the end of the sporting event. Participants are asked a plurality of questions, each question being a betting event. One or more betting lines are opened in each betting event. Players are allowed to bet tokens on an open betting line until it is closed by the administrator. Once a line is closed, a new line opens within the betting event. When a termination event occurs for a given betting event, the betting event is terminated and all lines are paid off in parimutuel style. Payoffs may be made in a hierarchical manner, such that players placing riskier bets in a betting line receive a higher parimutuel style payoff. The game may be played over the Internet.

67 Claims, 20 Drawing Sheets

| | | | | | | | | | | | | |
|---|---|---|---|---|---|---|---|---|---|---|---|---|
| TEAM 1 | 100 | 5-1 | 200 | 3-1 | 400 | 2-1 | 200 | 7-2 | 500 | 2-1 | 25 | 8-1 |
| TEAM 2 | 300 | 5-3 | 300 | 2-1 | 300 | 8-3 | 400 | 7-4 | 400 | 5-2 | 75 | 8-3 |
| BONUS | 100 | | 100 | | 100 | | 100 | | 100 | | 100 | |
| STATUS | CLOSED | | CLOSED | | CLOSED | | CLOSED | | CLOSED | | OPEN | |

| | 1 | | 2 | | 3 | | 4 | | 5 | | 6 | |
|---|---|---|---|---|---|---|---|---|---|---|---|---|
| Ans. A | 200 | 14:1 | 400 | 9:1 | 100 | 23:1 | 1000 | 2:1 | 1200 | 2:1 | 200 | 11:1 |
| Ans. B | 300 | 9:1 | 400 | 9:1 | 600 | 3:1 | 500 | 5:1 | 800 | 5:1 | 100 | 23:1 |
| Ans. C | 1000 | 2:1 | 100 | 39:1 | 300 | 7:1 | 100 | 29:1 | 200 | 29:1 | 1000 | 3:2 |
| Ans. D | 500 | 5:1 | 2000 | 1:1 | 400 | 5:1 | 400 | 7:1 | 400 | 7:1 | 100 | 23:1 |
| Bonus | 1000 | | 1000 | | 1000 | | 1000 | | 1000 | | 1000 | |
| Status | closed | | closed | | closed | | closed | | closed | | open | |

MULTI-PERSON PARIMUTUEL BETTING GAMES BASED ON DETERMINATE SPORTING EVENTS

CROSS REFERENCE TO RELATED APPLICATIONS

This application is a continuation-in-part of and claims priority to application Ser. No. 09/767,418, filed Jan. 23, 2001 now U.S. Pat. No. 7,172,508.

STATEMENT REGARDING FEDERALLY SPONSORED RESEARCH

Not applicable

REFERENCE TO A MICROFICHE APPENDIX

Not applicable

FIELD OF THE INVENTION

The present invention relates to sports games, and more particularly to multi-person parimutuel betting games based on determinate sporting events, including particularly trivia games. The game can be played using computers, such as over the Internet.

BACKGROUND OF THE INVENTION

Parimutuel betting is a form of gambling in which the winners of a betting event divide the total amount bet on the betting event. The winners split the pot according to the proportion of winning bets each winner places on the betting event. For example, if a total of $1,000 is bet on a betting event, a total of $100 is bet on the winning outcome of the betting event, and Player X bets $1 on the winning outcome, Player X would receive a parimutuel payoff of 1 percent of the $1000 pot, or $10. In order to cover costs and taxes, gambling establishments that administer parimutuel betting events typically deduct a percentage of the total amount bet before paying off the winners. Thus, in the foregoing example, the gambling establishment might retain 15 percent of the pot, or $150, and Player X would receive only $8.50. Horse races and dog races are typical examples of betting events that payoff on a parimutuel basis.

With the invention of the Internet and other computer network systems, various games have been devised that can be played over the Internet or on a computer network systems. Some of these games involve sporting events. As far as the inventor can, determine, no parimutuel betting game ("PBG") has been devised that incorporates the following characteristics of the present invention.

1) Hierarchical Parimutuel Wagering

The betting lines in a PBG can have a "tree" structure, as illustrated by the BATTER betting hierarchy shown in FIG. 8A. As far as the inventor can determine, the prior art does not provide a means for extending parimutuel wagering from a simple line with no branching (such as the lines used in horse racing and other sports books) to a hierarchical parimutuel payoff structure. The algorithm and methods discussed in section 4 provides such an extension. The odds on each choice in a hierarchal betting line is the payoff to a player placing one token on that choice, if it wins. The odds on each choice in turn reflect the PBG players' betting activity on that betting line.

2) Bonuses

"Bonuses" are not used in standard parimutuel wagering. The present invention provides methods for including bonuses in PBGs and for computing the "odds" on each choice in a way that takes the bonus into account. The bonuses are an important feature of the present invention. The bonuses are not just a simple way of giving players extra tokens. The bonuses inflate the odds on the choices, especially when the betting volume is low. This encourages players to bet early and often.

3) Open-Close-Terminate Sequences

In the PBG of the present invention, the Open-Close-Terminate ("O-C-T") sequences of the betting events have the following form $$O(1)<C(1)=O(2)<C(2)=O(3)<C(3)\ \ldots\ <C(n-1)=O(n)<T$$

For example, in the DRIVE event in football (described in further detail below; see FIG. 8C), a new betting line opens whenever the driving team gets a new set of downs, and possibly at other times too. Each time a new line opens, the previous line closes, so C(i)=O(i+1). The last line of the betting event terminates before it has a chance to close. This triggers all the lines in the betting event to pay off simultaneously. There could be numerous repetitions of this basic sequence (with a different "n" each time) in each game, e.g., there could be 10 or 20 DRIVE betting events in a typical football game. On the other hand, the winner event (see FIG. 8E) terminates only once: at the end of the game. There are numerous O-C-T rounds going on simultaneously, i.e., one for each betting event. A new line can be opened whenever the odds on the final outcome of the event suddenly change. This allows players to change their minds as events unfold in the game, but rewards players who guessed correctly early in a betting event.

4) Liquid—Frozen Asset Dynamics

In the PBG of the present invention, the players' assets (measured in "tokens") are divided into two types: "liquid" and "frozen." Liquid assets are tokens that players can use to place bets. Frozen assets are tokens that have been wagered on betting lines that have not yet terminated. Active players will always have some frozen assets, but they must be careful to keep some assets liquid, or they will not be able to place any new bets. When a line terminates, winners are paid off and tokens won become liquid. All the tokens bet on a line (the frozen assets) are forfeited when the line terminates, however players with winning bets recoup the tokens bet on that choice as part of their payoff.

5) Long-Term vs. Short-Term Bets

The lengths of the betting events differ for each betting event in the PBG of the present invention. Some rounds are short, like the DRIVE event in football, or the BATTER event in baseball. Some events like WINNER do not terminate until the end of the game, so there is only one WINNER betting event. However, many betting lines will open and close in a typical WINNER betting event since the odds are in a constant state of change. Due to the liquid-frozen asset dynamics just described, players must be clever about how they split their wagering between short term bets (which will become liquid again soon if they win) and long term bets (which will stay frozen, but may pay off very well if they win). In the PBG of the present invention, the players are free to bet any amount (as long as they have enough liquid assets to cover the bet) on any choice on any open betting line during the game. The "money management" aspect of the PBG may be as important as the "sports knowledge" aspect in skillful play.

6) Multi-Person Game of Skill

Due to the parimutuel-style wagering, the players in the present invention are in direct competition with each other, i.e., one player's winnings must come from other players' losses. Two or three players could compete in a PBG, or so could ten million. The game itself remains basically the same regardless of the number of players. As mentioned above, the game requires sports knowledge and money management skills. Skillful players will also monitor the assets of their opponents so that they can chose between risky and safe strategies.

7) Administrator with Responsibilities

The PBG of the present invention utilizes the services of an administrator. The administrator's primary duties are to open, close and terminate betting lines at appropriate times and declare the winning outcome when the line terminates. The administrator could be confined to rigid rules specifying when lines open, close, and terminate, but the game is more interesting when the administrator is an integral part of the game. In particular the administrator can be allowed quite a bit of room for judgment with respect to the times that new lines open (the termination times and winning choice should be unambiguous). As mentioned, new lines preferably open whenever the game situation changes enough so that the odds on the choices are significantly different than they were for the previous line. Lines can open at other times as well, for example, if the action on a line is heavy. All of these choices require judgment calls by the administrator. The administrator can also choose the bonus sizes (if he/she does not, bonuses can be set to some default amount), allocate tokens to players (e.g., give 100 tokens to everybody at the start of each quarter in a football game), and broadcast messages to the players.

8) PBG Based on Determinate Sporting Events, such as Trivia Games

As far as the inventor can determine, no efforts have been made to apply the concepts of a PBG to a determinate sporting event, such as a trivia or quiz game, in which contestants answer multiple choice trivia questions and are rewarded under a PBG format. In most quiz games, players are rewarded with points for correct answers. Points may be deducted for incorrect answers. As far as the inventor can determine, there are no quiz games which have any of the attributes of a PBG, including: parimutuel wagering on the answer choices; multiple answers permitted; hierarchical choice sets; O-C-T sequence for each question.

As far as the inventor can determine, the game with the most in common with the PBG of the present invention is QB1. Examples of QB1 can be viewed at www.buzztime.com and www.fox.com. Another game that is similar or identical to QB1 is "Enhanced TV," which can be viewed at www.espn.com and www.abc.com. Because QB1 and Enhanced TV are very similar, the following discussion will focus on QB1. Based on information and belief, QB1 was first used in public during the summer of 2000. QB1 consists of a series of opportunities to guess the next play in a football game. In a baseball version of QB1, players would guess what a batter will do in a baseball game. The individual opportunities "open", "close" and "terminate," although QB1 does not use this terminology. There is an element of tree-like structure to the choice set in QB1. For example a player can guess that the next play will be a pass, or be more specific and guess pass-long-right. QB1 is a multi-person game played over the internet and there is an administrator, who is termed a "referee." However, in addition to the above similarities, there are significant differences between QB1 and the present invention.

QB1 is not a betting game. It is more like a "trivia" game: players make guesses and are either right, partly right, or wrong. "Payoffs" only depend on their answers. The PBG of the present invention is a betting game. Players choose how much to wager on their choices and they can bet on more than one choice. The payoffs are parimutuel style, so the amount a player wins depends on what other players do. In QB1, players simply accumulate points. There is no analog of liquid and frozen assets since there is no betting. Also, the Open-Close-Terminate sequences in QB1 are simple and predetermined. The O-C-T sequence in QB1 is always $$O(1)<C(1)<T(1)<O(2)C(2)<T(2)<O(3)<C(3)<T(3)$$

Contrast this with the PBG sequence described above.

Although QB1 is a multi-person game, it lacks the direct competition between the players that the PBG of the present invention has. In QB1, each player is essentially playing against the house. The activity of other players, or even their existence, is irrelevant to the player's score. Thus QB1 is best described as N (the number of players) player vs. house games in parallel, whereas the PBG is truly an N person game. There is no money management aspect to QB1, so it is not a game of skill to the extent that the PBG is. The administrator or "referee" in QB1 is essentially an automaton. There is very little, if any, room for him or her to exhibit any style, or to make decisions effecting the game. This is due mainly to the trivial nature of the O-C-T sequences of QB1.

Other methods of conducting sports games over computer networks are known. For example, U.S. Pat. No. 6,015,345 (Kail) discloses methods of conducting games of chance using predicted sums of scores in sporting events. A weekly or other regularly scheduled game of chance is conducted in conjunction with a series of seasonal sporting events, such as baseball, football, hockey, U.S. and international basketball and volleyball games, in which a number of specific games are identified on a printed or electronic game card, and the participant marks the game card with the predicted total of points scored by both teams for each of the identified sporting events, which can include one or more alternate events. Data related to predicted scores and the fee paid are entered into a programmed central computer system for eventual processing and matching with data entered for the actual scores when the identified games are completed to identify the winners. The participant receives a receipt and unique transaction code. Participant data entry and payment means can include third-party ATMs and cash machines, and third-party vendors and participants' PCs connected to the central computer via the Internet, with payment made through the participants' credit or debit accounts. In an alternative embodiment, predictions can include the actual number of points scored during subsets of the contests.

U.S. Pat. No. 5,683,090 (Zeile et al) discloses a sports chance game comprising an apparatus and method for playing a sports chance game that includes means for storing team names, players on each team, and a first group of occurrences which could happen during a sports event contested by the two teams. A processor randomly selects a second group of occurrences from the first group of occurrences and randomly arranges each of the second group of possible occurrences into individual locations on a patterned layout on a scorecard for a verified user of the game. The processor determines matches between the second group of possible occurrences on each scorecard with events which actually occurred at the sports event and determines a winning scorecard based on a certain number of matches and/or the location of the matches on each scorecard.

U.S. Pat. No. 5,772,512 (Chichester) discloses an electronic football game in which a game system is implemented on a digital computer that is connected to a network such as the Internet. The game system enables a user to chose members of a football team and play a game of football against an opponent at a remote location. A copy of all game parameters are stored in two different media-a RAM and a disk memory. The user's graphical and keyboard inputs are fed into the RAM as events initiated by the user. The opponent's inputs are fed into the user's disk memory as write statements. A microprocessor is used periodically and systematically to compare the parameters in the user's RAM to the parameters stored in the user's disk memory. If there is a discrepancy between the RAM parameters and the disk memory parameters, the microprocessor will update any of the parameters on the user's RAM or send write signals to update the opponent's disk memory based upon the type of discrepancy detected.

U.S. Pat. No. 5,830,069 (Soltesz et al) provides for the transmission and conduct of a bingo game at more than one site, through the use of a private wide area network ("WAN"), on which participants are qualified and controlled. Each site has a PC computer, with peripheral equipment, which communicates on a WAN. This is done by the present invention with considerably less hardware setup cost at each location, and with a lower operating cost, than is found in the prior art. Access to the present invention is more easily controlled than under the video broadcast prior art, and unauthorized participants may be more easily excluded from participation.

U.S. Pat. No. 5,957,775 (Cherry) discloses a wagering game based on a ranking order of game participants. A wagering game played by a player includes a set of game participants, an identification number assigned to each of the game participants, and a game number. The player places a wager based on the game number, and a ranking order of the game participants is determined, such as by a race. The sum of the identification numbers of a subset of the game participants is calculated, the subset of game participants having a predetermined number of game participants selected on the basis of the ranking order of the game participants. Whether the player's wager is a winning wager is determined by comparing the sum to the game number. The wagering game may be implemented as an electronic game.

U.S. Pat. No. 6,120,376 (Cherry) also discloses a wagering game based on a ranking order of game participants. A wagering game for play by a player includes a set of game participants, an identification number assigned to each of the game participants, and a game number. The player places a wager relating to the game number, and a ranking order of the game participants is determined, such as by a race to a finishing point. The sum of the identification numbers of a subset of the game participants may be calculated. The number of lengths by which a first ordered game participant beats another ordered game participant to the finishing point may also be calculated. Whether the player's wager is a winning wager is determined by comparing the sum or the number of lengths to the game number. The wagering game may be implemented as an electronic game.

U.S. Pat. No. 6,126,543 (Friedman) discloses a method for wagering on multiple sporting events. Each sporting event involves two teams, each team having associated therewith a point spread used in determining whether a wager made on the team is won. The bettor selects a team from each of two or more events upon which to place a wager. The point spreads associated with the selected teams are summed to define a combined point spread wager, and the bettor wagers on the combined point spread. The bettor wins the wager if a sum of point differentials associated with the selected teams as determined from the results of the sporting events covers the combined point spread. Combination bets may also be placed on over/under numbers. Combination betting allows bettors to place an interest on a number of different games while maintaining that interest until all games are completed.

There remains a need for a game that accomplishes the following objects and achieves the following benefits over the prior art.

OBJECTS AND SUMMARY OF THE INVENTION

It is an object of the invention to provide a PBG that can be played between a plurality of players via a computer network.

It is another object of the invention to provide a PBG based on events unfolding during a determinate sporting event, such as a trivia game, a principal objective of the game being to acquire the largest number of betting tokens by the end of the sporting event, and wherein the players are in direct competition because payoffs are parimutuel style.

It is another object of the invention to provide a PBG that incorporates a hierarchical parimutuel style payoff structure.

It is another object of the invention to provide a PBG that can be used to calculate the odds on a plurality of betting choices in terms of the PBG players' betting activities.

It is another object of the invention to provide a PBG that incorporates bonuses to encourage players to place bets early on the betting lines, thereby keeping every line active.

It is another object of the invention to provide a PBG that uses an Open-Close-Terminate Sequence of the form $O(1)<C(1)=O(2)<C(2)=O(3)<C(3) \ldots <C(n-1)=O(n)<T$, thereby providing multiple betting lines for each betting event.

It is another object of the invention to provide a PBG in which numerous O-C-T betting events are being conducted simultaneously.

It is another object of the invention to provide a PBG which incorporates liquid-frozen asset dynamics.

It is another object of the invention to provide a PBG that includes both long term and short term betting events.

It is another object of the invention to provide a PBG that can be played by a plurality of players all competing directly against each other for shares of the winning pot.

It is yet another object of the invention to provide a PBG that utilizes the services of an administrator and in which the administrator exercises responsibility and exercises judgment in administering the game.

These and other objects and advantages of the invention shall become apparent from the following general and preferred description of the invention.

Accordingly, a PBG is provided for playing by a plurality of players, typically over the Internet. The parimutuel betting game is based on events unfolding during a determinate sporting event, such as a trivia game or a replay of a sporting event. A principle objective of the game is to acquire the largest number of betting tokens by the end of the sporting event. The players are in direct competition because payoffs are made in parimutuel style. Tokens are preferably allocated to the players prior to commencement of the determinate sporting event. A plurality of betting events are conducted during the sporting event. Each of the betting events is based on a bettable event occurring during the determinate sporting event. Each step of conducting a betting event comprises selecting a betting event from the bettable events and administering at least one betting line for the betting event. Each step of administering a betting line comprises: opening a betting line for the betting event, the betting line based on a finite set of possible outcomes of the betting event; allowing the players an amount of time within which to selectively bet tokens on the possible outcomes of the betting event; freezing tokens bet on the open line such that the frozen tokens are not available for further betting until a payoff has been made on the betting event; closing the betting line after a selected interval such that no further tokens may be bet on the line; monitoring the sporting event until a termination event occurs with regard to the betting event; and terminating the betting event upon occurrence of the termination event for the betting event. Upon termination of the betting event, winners of each of the betting lines are paid off in parimutuel style. The process of selectively conducting betting events is repeated until the sporting event has concluded.

In a preferred embodiment, the PBG is played in a computerized format, such as over the Internet, and is administered by an administrator. The administrator can be a computer processor. A host processor is provided, the host processor being programmed for analyzing and processing input data and outputting data and information relevant to the parimutuel betting game. A plurality of player processors are interactively connected to the host processor. The player processors are programmed for playing the PBG. Each player processor has a display means operatively associated therewith for displaying data received from the host processor and for entering data and sending data to the host processor. An administrative processor is interactively connected to the player processors via the host processor. The administrative processor is programmed for administering the parimutuel betting game. The administrative processor has a display means operatively associated therewith for displaying data received from the host processor and for entering data and sending data to the host processor. An administrator browser page is displayed on the display means of the administrative processor. A player browser page is displayed on the display means of each player processor. The processors are used to allocate betting tokens to each of the players prior to commencement of the determinate sporting event. The administrator monitors the determinate sporting event for situations giving rise to bettable events. The players and the administrator use the browser pages and the processors to conduct the plurality of betting events. The administrator selects the betting events. The administrator uses the administrative browser page to open a betting line for the betting event. When the administrator opens a new betting line, the administrative processor sends a betting line identifier and a bonus amount for the new line to the host processor. Upon receiving the betting line identifier for the new line, the host processor opens a new betting line. Betting event information for the open betting line is displayed on the display means of the player processors. The players are allowed an amount of time within which to use the player browser pages to selectively bet tokens on the possible outcomes of the betting event. For each bet placed by a player on a betting line, data concerning the bet is sent to the host computer for processing. The data includes a player identification, a betting line identification, a betting choice identification, and an amount bet. Tokens bet on the open betting line are frozen such that the frozen tokens are not available for further betting until a payoff has been made on the betting event. Updated betting information for each betting line is displayed on the player browser pages. After a selected interval, the administrator closes the betting line such that no further tokens may be bet on the line. When the administrator closes the line, the administrative processor sends the line identifier for the new line to the host processor. Upon receiving the betting line identifier, the host closes the new betting line such that no further bets can be placed on the line. The administrator monitors the sporting event until a termination event occurs with regard to the betting event. The administrator terminates the betting event upon occurrence of the termination event for the betting event. When the administrator terminates the betting event, the administrative processor sends the line identifier and a winning choice identification to the host processor for calculating the parimutuel payoff on the betting lines. Upon termination of the betting event, winners of each betting line in the betting event are paid off in parimutuel style, with the payoffs being determined and processed by the host processor. Updates are performed on a periodic basis wherein the host processor sends data to all the player processors and the administrative processor reflecting changes to the browser pages. The process of selectively conducting betting events is repeated until the conclusion of the determinate sporting event.

Bonus tokens are preferably allocated to the betting lines in order to encourage players to bet on the open line. The bonus tokens are paid to winners of the betting line in parimutuel style. In a preferred embodiment, only one betting line is open at any given time in a given betting event, to thereby encourage the players to bet on the betting line before the betting line closes. A new betting line is preferably opened substantially whenever a prior betting line closes, to thereby constantly challenge the players to evaluate an open betting line within the betting event. Players are preferably allowed to place multiple bets on any open betting line. Additional tokens may be allocated to the players at selected intervals during the game, preferably in equal amounts.

In a preferred embodiment, at least one of the betting events has a hierarchal parimutuel style payoff tree structure. The hierarchical parimutuel style payoff tree structure has at least two primary outcomes. At least one of the primary outcomes in the hierarchical betting event has at least two secondary outcomes, such that whenever one of the secondary outcomes is a winning bet, one of the primary outcomes is also a winning bet. Winning bets placed on the secondary outcomes receive a higher parimutuel style payoff than winning bets placed on the primary outcomes. At least one of the secondary out/comes in the hierarchical betting event may also have at least two tertiary outcomes, such that whenever one of the tertiary outcomes is a winning bet, one of the secondary outcomes and one of the primary outcomes are also a winning bet. Winning bets placed on the tertiary outcomes receive a higher parimutuel style payoff than winning bets placed on the secondary outcomes. At least one of the tertiary outcomes in the hierarchical betting event can have at least two quaternary outcomes, such that whenever one of the quaternary outcomes is a winning bet, one of the tertiary outcomes, one of the secondary outcomes, and one of the primary outcomes are also a winning bet. Winning bets placed on the quaternary outcomes receive a higher parimutuel style payoff than winning bets placed on the tertiary outcomes.

A means for determining payoffs for hierarchical choice sets that retains the flavor of a parimutuel style is provided.

In a preferred application, each hierarchical payoff in the hierarchical betting event is share(n, $l_m$) determined through step-wise application of a recursive algorithm to the hierarchical payoff tree structure, the recursive algorithm being $$share(n,l_k)=[share(n,l_{k-1})[subbets(l_k)+Bonus(l_k)]]) [bets(l_{k-1})+subbets(l_{k-1})+Bonus(l_{k-1})]+wager(n, l_k)$$

wherein $l_k$ is the outcome whose sub-outcome is $l_{k-1}$, k takes values 1, 2, 3 . . . m m is the number of branches outcome to is from a base of the hierarchical payoff tree structure, $l_0$ is the winning outcome that is a leaf of the hierarchical payoff tree structure, n=player placing bet, subbets($l_k$)=total number of tokens bet on subbets of $l_k$, bets($l_k$)=total tokens bet on $l_k$ itself, wager(n, $l_k$)=total tokens bet on $l_k$ by player n, share(n, $l_0$)=wager(n, $l_0$), and Bonus(l)=bonus(l) if subbet(l)>0, and 0 if subbet(l)=0.

The tokens may have no monetary basis, and can simply be electronic units maintained by the processors. Alternatively, the players can pay money to a gambling establishment in exchange for the allocation of tokens, in which case the gambling establishment can retain a percentage of tokens bet on the betting lines.

PREFERRED EMBODIMENTS OF THE INVENTION

Figure 1:
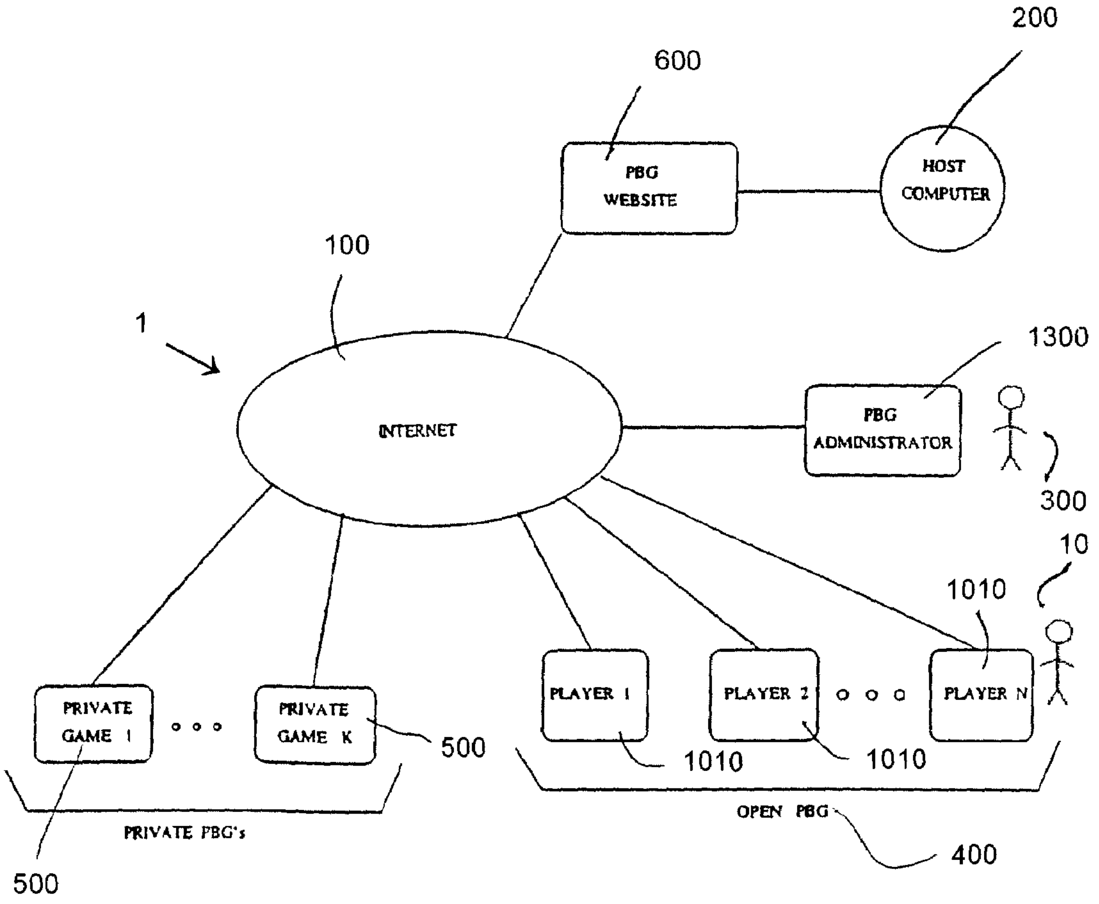
FIG. 1 is a block diagram representing one preferred embodiment of a set-up for playing the PBG of the invention over the Internet.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

1.1 Overview of the Present Embodiment of the Invention

The invention is multi-person parimutuel sports betting game based on determinate sporting events, including particularly trivia or quiz games. The game is adapted for play over networks, including primarily the Internet. The present invention is a variation on the inventors' previously filed application for a multi-person parimutuel sports betting game based on live (i.e. indeterminate) sporting events. The text of applicants' original multi-person parimutuel sports betting game is set forth herein below. In order to preserve the structure of the original application, the unique aspects of the present invention will be discussed primarily in Section 3.5 below. The aspects discussed in Section 3.5 are used with the basic system described herein and in applicants' previous application.

The present embodiment of the invention is directed to a particular type of sporting event that will be referred to as a "determinate sporting event." A determinate sporting event is one in which the outcome of each betting event is known. An example of a determinate sporting event is a trivia or quiz game in which players answer questions posed to them. The correct answers are unambiguous and are known to the game administrator. Another example of a determinate sporting event is a replay of an event that has already occurred, such as a replay of a football game or a rerun of a movie or television program that has already been broadcast to the public. In replays, the outcome of each betting event is known to the administrator of the game. In watching the replay, players who have already seen the event are likely to remember the outcome of some but not all of the selected betting events, just as some players in a trivia game will know the answer to a particular trivia question.

1.2 General Overview of the System of the Invention

A parimutuel betting game 1 (hereinafter, "PBG") is described that can be played by a very large number of players 10 over the Internet, or a smaller number of players 10 in a local setting like a sports bar or living room. The PBG involves a series of opportunities to wager on events associated with a live or determinate sporting event, such as a baseball or football game. Alternatively, the event may be a trivia/quiz game, as described in section 3.5 below. The players 10 will typically watch or listen to a live broadcast of the game, but the game may also be played in the sporting arena where the sporting event is taking place. The term "sporting event" will generally be used herein to refer to a single game or match (e.g. in tennis). However, it will be appreciated that virtually any real-time event that has a series of repeating events with random outcomes can be considered a "sporting event." Thus, the PBG can also be applied to longer term events, such as the standings in a sports league, the outcome of a tournament, or the outcome of a multi-game series (e.g. the seven game World Series in baseball). Additionally, there are numerous situations in which the PBG could be applied to other events that would not typically be considered "sporting events," such as the returns from an election, the outcome of a court proceeding, or the gains and losses on a stock market. Thus, although the present invention will generally be described and claimed in the context of sporting events, the term "sporting event" should be given the broadest possible interpretation consistent with the present disclosure and the prior art. In the foregoing examples, the outcomes of each betting event within the sporting event are unknown. Because the outcomes are unknown, these types of sporting events can be referred to more specifically as "indeterminate sporting events."

Figure 8A:
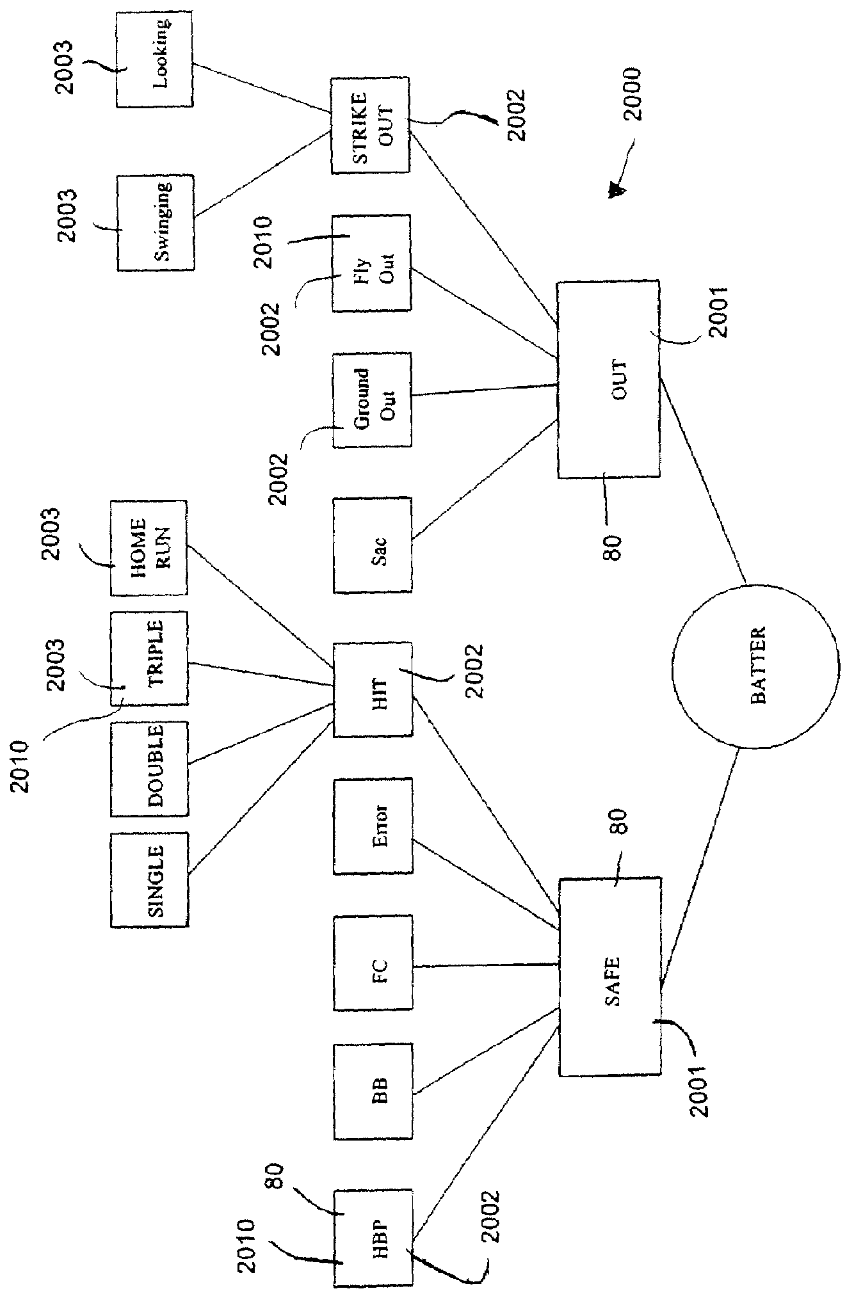
FIG. 8A is a block diagram representing a hierarchical parimutuel style payoff tree structure for a betting event based on an at-bat in a baseball game.

The betting lines in the PBG of the invention can have a hierarchical "tree" structure, as illustrated by the At-Bat, Inning, Drive, Next Score, and Winner hierarchies shown in FIGS. 8A-8E. As far as the inventor can determine, the prior art does not provide a means for extending parimutuel wagering from a simple line with no branching (such as the lines used in prior art horse racing and other sports books) to a hierarchical parimutuel payoff structure. The algorithm and methods discussed in section 4 provide such an extension. As shown in FIG. 8A, in a preferred embodiment at least one of the betting events 18 has a hierarchal parimutuel style payoff tree structure. The hierarchical parimutuel style payoff tree structure has at least two primary outcomes 2001. At least one of the primary outcomes 2001 in the hierarchical betting event has at least two secondary outcomes 2002, such that whenever one of the secondary outcomes 2002 is a winning bet, one of the primary outcomes 2001 is also a winning bet. Winning bets placed on the secondary 2002 outcomes receive a higher parimutuel style payoff than winning bets placed on the primary 2001 outcomes. At least one of the secondary outcomes 2002 in the hierarchical betting event may also have at least two tertiary outcomes 2003, such that whenever one of the tertiary outcomes 2003 is a winning bet, one of the secondary outcomes 2002 and one of the primary outcomes 2001 are also a winning bet. Winning bets placed on the tertiary outcomes 2003 receive a higher parimutuel style payoff than winning bets placed on the secondary outcomes 2002. At least one of the tertiary 2003 outcomes in the hierarchical betting event can have at least two quaternary outcomes (not shown), such that whenever one of the quaternary outcomes is a winning bet, one of the tertiary outcomes 2003, one of the secondary outcomes 2002, and one of the primary outcomes 2001 are also a winning bet. Winning bets placed on the quaternary outcomes receive a higher parimutuel style payoff than winning bets placed on the tertiary outcomes 2003.

The wagering is parimutuel style, which is an extension of the standard race track system in which the players choosing the winning bet on a betting line share the pot in proportion to their individual wagers. The players 10 place bets with electronic tokens 40 that may or may not have any real value. The pot is all the tokens 40 bet on a given line 20 by the players 10 plus a bonus 30 supplied by the house. Betting lines open 22 and close 24 at well defined epochs during the game, and involve (depending on the type of betting event) a well defined choice of bets 80. The players 10 decide which choices 80, if any, they want on each betting line 20, as well as the amount of the bets 86 (See e.g. FIG. 7A). Players 10 place bets by clicking on the appropriate boxes on their betting screens 620. Players 10 are free to bet on any open betting line 20. Betting lines 20 are terminated 26 as soon as the outcome of the betting event 18 is known, at which time winners are paid off. Tokens 40 invested in betting lines 20 that have not yet terminated (i.e. open 22 or closed 24 betting lines 20) are frozen 44, and are unavailable for placing new bets. As soon as a line 20 is terminated 26, any tokens won on that line are immediately available for placing new bets. All accounting is done automatically by a host computer/processor 200. A simple way to play the PBG is to start each player 10 with a certain number of tokens 40 and declare the winner to be the player 10 with the most tokens 40 when the sporting event is over. For most sporting events, a human administrator 300 is necessary to open, close, and terminate betting lines, although a fully automated version may be possible in the future.

However, for determinate sporting events such as quiz games, a human administrator 300 is not required. In a trivia version of a PBG, the answer is known in advance (i.e. it is programmed into the program or it is part of an associated database), so a human administrator is not required. Because the lines open and close at selected intervals or according to a random clock 27 (discussed below), the game can be completely automatic.

A mathematical description of the game, using the language of stochastic processes, makes it possible to describe precisely when a betting game is a PBG. In a preferred embodiment, the invention is a class of betting games specified by five mathematical properties.

As shown in FIG. 1, players 10 use a terminal or player processor 1010 (e.g., a screen and mouse; a cellular telephone; a palm pilot) to play the game. The players' terminals 1010 are connected (typically via the Internet) to a host computer 200 (typically at a PBG web-site 600). The PBG of the invention takes place during a live sporting event, such as a quiz game. Typically the players 10 watch the sporting event on television, but other scenarios are also possible. For example, at the time of filing of this patent application, wireless communications make it possible to receive information from and send information to the Internet, such as via a cellular telephone, a palm pilot, or a stand alone lap top computer. With wireless communication such as via a cellular telephone, a palm pilot, or laptop, players 10 can play the PBG from virtually any location, including the stadium or other facility where the live sporting event is taking place. There is no theoretical limit to the number of players 10 that can participate in a PBG. The PBG of the invention can also provide an interesting contest between a small number of players 10 (even two or three).

The wagering is "continuous" in the sense that there are constantly new opportunities to place bets during the game. These opportunities take the form of betting lines 20 that open and close at various epochs during the game. When the outcome of a betting line 20 is determined, the line 20 is terminated 26, and the winners are paid off. The losers lose their bets, which are paid to the winners. All non-terminated lines 20 in a given betting event 18, whether open 22 or closed 24, terminate at the same time. A well administered PBG will follow the action in the sporting event very closely, with betting lines associated with all the pivotal events in the game, and preferably some of the more mundane as well.

Figure 7A:
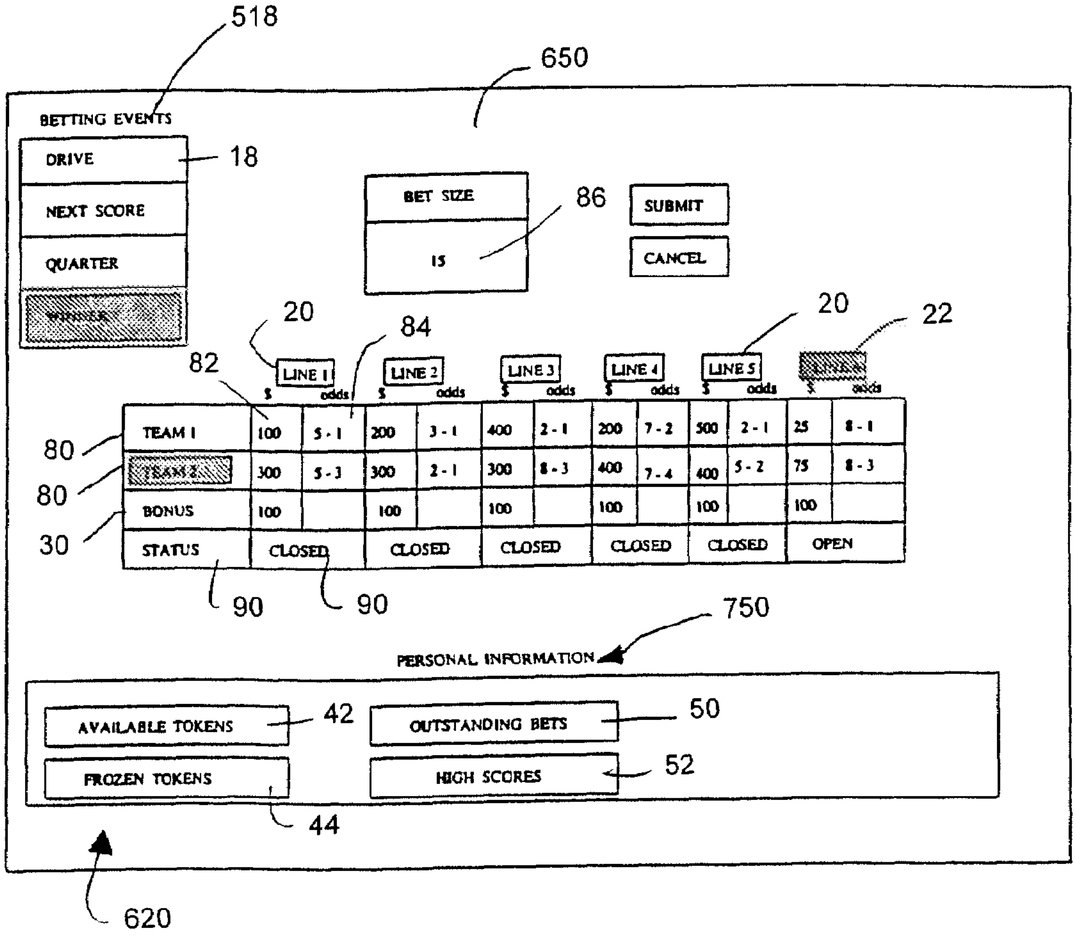
FIG. 7A is one preferred embodiment of a player betting screen.
Figure 7B:
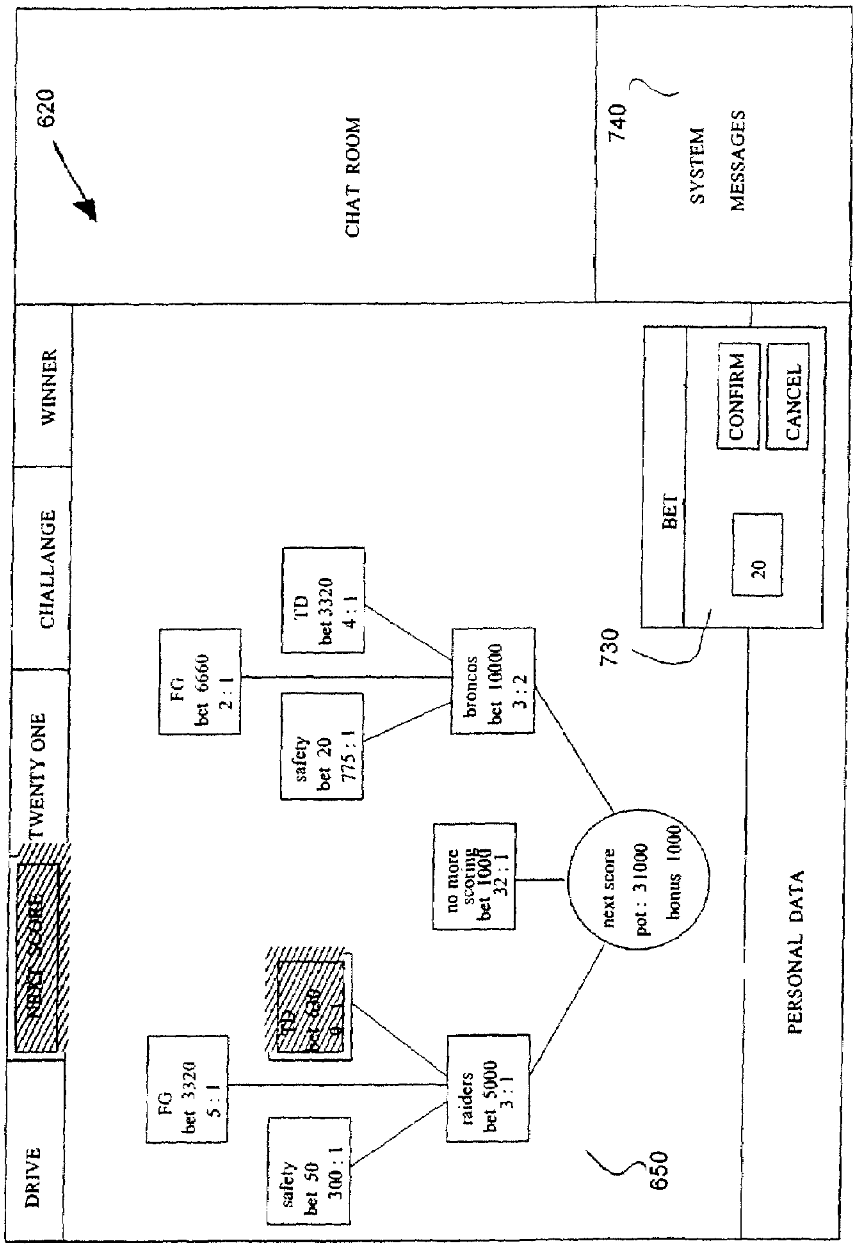
FIG. 7B is one preferred embodiment of a player betting screen, showing a configuration for displaying a hierarchical betting line.

As shown in FIGS. 7A and 7B, players 10 place bets by clicking or otherwise selecting the appropriate boxes on their betting screens 620. The currency is in the form of electronic tokens 40 that may or may not have any monetary value. For example, the players 10 might receive an allocation of one hundred tokens each at the beginning of the game. The winner is the player 10 who has acquired the most tokens at the end of the game. The winner is preferably rewarded with a prize. In that case the tokens need not have any monetary value. However, it is possible to play a PBG with real money.

Players 10 can bet on any open betting line 22. When a line closes 24, the players 10 can no longer place bets there. Only the most current line 20 is open 22, but there may be many closed lines that have not yet terminated. In order to remove the effect of packet delay on the Internet, the time of each bet is "stamped" on it when it leaves the player's terminal 1010. The bet is accepted into the line 20 that was open 22 when the bet was time stamped, unless it arrives to the host 200 after the line terminates 26. Players 10 can place as many bets as they wish, including multiple bets on the same line 20. As shown for example in FIG. 7A, once a player 10 places a bet, the tokens 40 involved are no longer available for further betting, i.e. the tokens are "frozen" 44.

Some betting events 18 terminate numerous times during a game. For example, a football betting event 18 like "How will the current drive end?" terminates every time a drive (by either team) ends. Other betting events 18, like "Who will win the game?" only terminate once. In either case there may be numerous betting lines 20 that terminate 26 simultaneously at termination time(s). The idea is to open 22 new lines 20 at semi-regular intervals and whenever the odds on the eventual outcome of an event change abruptly.

When a new line 20 opens 22, the previously open line 20 preferably closes. The exception to this rule is just after a betting event 18 terminates 26. When a betting event 20 terminates 26 the currently active line 20 closes 24, so that when a new line 20 opens 22, the previous line 20 is already closed 24. Occasionally it might be wise to close 24 a line 20 without opening a new line 20 immediately. By opening 22 and closing 24 lines 20 this way, the odds on the currently open lines 22 always reflect the current estimates (by the players 10) about the relative likelihoods of the choices on the betting lines 20. The odds may change many times before termination 26 of the betting event 18. For example, early in a "drive" the money may be on punt, while on later lines in the same drive the money may shift to field goal or touchdown.

There is a "house" that supplies a host computer 200 and administers the PBG. Typically, the house will be a PBG web-site 600, but a sports bar (for example) could hold a "local PBG" among its patrons and serve as the house. All accounting for the PBG is done by the host computer 200. The tasks of opening 22, closing 24 and terminating 26 betting lines cannot be done automatically at the present time, so for sporting events with unknown outcomes, a human administrator 300, watching the game along with the players 10, is needed. Typically the administrator(s) 300 will be associated with the PBG web-site 600, but other scenarios are possible (e.g., a bartender could serve as administrator 300 for a local PBG at a sports bar). The administrator 300 may also send messages to players 10 (advice, kibitzing, humor, etc.), and make certain kinds of "administrative" decisions.

The payoffs on each betting line are "parimutuel style," meaning that the winners split the "pot" in proportion to the size of their bets (see section 4 for details). In horse racing, where parimutuel betting is the norm, the pot is typically 85% of the money wagered on the line, due to the house "take" of 15%. In a PBG, the house 600 will typically do the reverse; it adds a bonus 30 to the amount wagered on the line 20.

The amounts of the bonuses on the betting lines are known to the players 10, and their presence alters the betting strategies used by skilled players 10. In particular, the bonuses 30 provide an incentive for every betting line 20 to be "active." To visualize this effect, imagine an inactive line 20 with a bonus 30 of one hundred tokens: If a lone player 10 bets one token on the most likely outcome on that line 20, his/her payoff odds are effectively 100-1 on that bet. Other players 10 alert to this opportunity will jump in as well, reducing the payoff odds in the process. The proper size of the bonuses depends on the number of players 10 and the typical size of their bets. The administrator 300 may have the duty of assigning bonuses 30 to the betting lines, and possibly revising them in certain cases.

As shown in FIGS. 7A and 7B, players 10 have access to betting screens 620 through their terminals or player processors 1010. The players 10 use the betting screens 620 to see the betting lines 20 for the various betting events 18 and to place bets. Player personal information 750, consisting of statistics like the number of tokens available 42 to the player 10 for placing bets, a list of frozen bets 44, outstanding bets 50, and highest opponent scores 52, can also be displayed on the betting screens 620.

The choices on each betting line 20 are preferably distinct and inclusive, meaning that exactly one of the leaves 2001 of the betting tree structure 2000 will prevail. If, somehow, more than one choice prevails then players 10 betting on any of the winning choices are winners. If, somehow, none of the choices prevail then the line 20 is voided and the players' 10 tokens are returned. The administrator's 300 judgment is final in these unusual cases.

Each betting line 20 also has a bonus 30 associated with it that is paid off to the winners along with the rest of the pot. For each choice 80 on the betting line 20 the crucial statistics (for the players 10) are the total number of tokens 82 that have been bet (so far) on that choice 80 and the payoff odds 84. As with horse racing, the odds 84 on the choices 80 change every time a player 10 makes a bet, so the odds 84 are only a guide to the eventual payoffs.

When a line is terminated 26, the players 10 with winning bets are paid off, increasing their stash of tokens 40 available for placing bets, and the losers lose their bets. The winners split all the tokens 40 bet on that line 20, plus the bonus 30, in parimutuel style as described in section 4. It is preferable (but not necessary) to restrict bets to whole numbers of tokens 40, and round up payoffs to the nearest whole number of tokens 40.

In order to play a PBG there must be some mechanism for opening 22, closing 24, and terminating 26 betting lines. The easiest way to do this, particularly for indeterminate sporting events, is to have a human administrator 300 who watches the sporting event along with the players 10 (typically at some remote location) and has the responsibility of opening 22, closing 24 and terminating 26 betting lines 20. The administrator 300 also may have the responsibility for allocating tokens 40 to the players 10 (at the beginning of the game, for example), choosing the size of the bonuses 30, and perhaps sending messages to the players 10. The administrator 300 could be one of the players 10, although the typical PBG will have an impartial administrator 300 that is not one of the players 10. The administrator 300 is preferably given broad responsibility for conducting the game 1 and particularly for making decisions such as when to terminate a betting line 20. However, the game 1 can also be played under strict rules where the administrator 300 has no or very little discretion. A strict embodiment of the PBG 1 might be favored in casinos or other professional betting environments that are typically subject to strict government regulation, so that there is no question that the administrator 300 is administering the game 1 in an impartial manner.

All "accounting" is done by the host computer 200. Probably the best way to administer a PBG is to have a web-site 600 provide the service. An administrator 300's primary duties are independent of the location, quantity, and activities of the players 10, so an administrator 300 associated with a PBG web-site can simultaneously administer many separate PBG's (as long as they are all associated with the same sporting event). For example, a PBG administrator 300 could simultaneously administer the following contests:

A small group of friends might watch the sporting event in a living room with a television and a home computer 1010 connected to the PBG web-site 600. The group of friends request a "private room" 500, so the contest is between the players 10 in the group of friends and nobody else. The players 10 must agree on some protocol for sharing time in control of the computer 1010 so that they can all place bets and access the information they need.

A sports bar could have a terminal and mouse (or some analogous device) 1010 at each table connected to the PBG web-site 600. The bartender, acting as captain, might request a private room 500 for the bar patrons 10. One sports bar could play against another sports bar, as another example.

The largest contests would be open PBG's, played by anonymous players 10 from around the world, connected to the PBG web-site 600. Some players 10 might be at home, while others could be at a bar or restaurant with a system like the one described above. Some players 10 could even be watching the sporting event live at the stadium while playing the PBG via a telephone, a laptop computer, or a palm pilot.

To set up a "private room", one of the players 10 (the "captain") would specify the players 10 involved, and a few game parameters, like the set of betting events 18 and the size of the bonuses 30. The administrator 300 would only be needed to open 22, close 24 and terminate betting lines 26. Section 6.2 describes an example of a screen 580 on a PBG web-site that could be used to set up private games 500. Players 10 that do not request a private room 500 would (by default) play in the open PBG.

Example of Dynamics of the Game

Now that all the pieces of a PBG 1 have been described, the dynamics of a typical "round" can be imagined. If the object of the game is to have the most tokens 40 at the end of the game, experienced players 10 are likely to make a lot of bets since the bonuses 30 ensure that (on average) players 10 are winning more than they are losing. Players 10 are especially on the lookout for inactive or lightly active betting lines 20 since the bonus 30 significantly increases the payoff odds. Experienced players 10 will not use all their tokens on lines 20 that terminate at the end of the game (e.g. the "Winner" betting event 18) since tokens 40 bet on such lines 20 remain frozen 44 throughout the PBG. The PBG is fast paced, but not frantic. New lines appear every minute or so on average, depending on the sport and the number of betting events. Players 10 want to wait as long as possible before wagering tokens on a betting line 20 (so as to maximize their information), but if they wait too long the line 20 might close 24. Therefore, a little randomness in the administrator's 300 closing times will tend to spread the times that players 10 place bets more evenly. Since the highest scores 52 are public information, players 10 are aware of how much they need to make up as the game draws to a close. Players 10 far behind are likely to bet on "long shots," while players 10 in the lead are more likely to play conservatively. Of course, with parimutuel betting, if lots of players 10 bet on a long shot, it ceases to pay off like a long shot. Experienced players 10 will therefore manage their betting line "portfolios" carefully throughout the game.

The basic software architecture of a PBG web-site 600 is described in sections 6.3 and 6.4. It is possible to play a PBG without the use of a PBG web-site 600 or any other Internet service. A small group of friends could have a "PBG program" running on a home computer 200, and they could administer the game themselves. In a sports bar, terminals at individual tables could be connected to a host computer 200 behind the bar in, for example, an Ethernet configuration, and a bartender could serve as the PBG administrator 300. The PBG web-site 600 can therefore be thought of as a service provided for PBG enthusiasts. The most obvious reason why a group of players 10 might choose to play a PBG without using a PBG web-site 600 is that the sporting event the players 10 are watching is not among the games being administered by any PBG web-site 600.

Even if one ignores differences in the way PBG's are administered, there are still countless (logical) versions of the PBG. Virtually any sport broadcast on television can be the basis of a PBG, and in fact there are numerous versions of the PBG for every sport. The class of betting games that are instances of the basic PBG can be described precisely using the mathematical language developed to study stochastic processes. The abstract description of a PBG using mathematical notation is detailed in section 5; however, it is perhaps best to begin by describing a specific example.

2. Example of a Football PBG Played in a Sports Bar

Imagine a football game broadcast on television, and a few dozen people watching the game at a sports bar. Each table at the bar has a terminal (screen and mouse) 1010. In this example, the people at a table will act as a single player 10. The terminals are connected to a PBG web-site 600 that administers the PBG for the football game they are watching. The bartender, who is also connected to the web-site 600 through a terminal 1010 behind the bar, serves as "captain." The bartender, acting as captain, requests a "private room" 500 so that the PBG is a contest between the bar patrons 10 and nobody else. The bartender chooses the betting events 18 the players 10 will bet on from a menu on the Captain's screen (See FIG. 2).

In this example, the following four betting events 18 have been selected:

Drive: the outcome of the current drive,

Next Score: which team will score next (and how),

Quarter TDs: the number of touchdowns scored in the current quarter, and

Winner: the winner of the game.

The bartender/captain also selects the "house rules" for the private game. In this example, the bartender selects the following house rules for the private. The players 10 are given 100 tokens at the beginning of each quarter (this allows players 10 to jump in after the football game begins). Bonuses on the drive lines are 50 tokens and all other lines have 100 token bonuses. The winner of the PBG is the player 10 (table) with the most tokens 40 at the end of the football game. The winning table gets a free round of beers. As shown in FIG. 7A, besides all the betting lines 20, players 10 have access to their current available 42 and frozen token 44 counts, and a list of the highest scores 52 from among the players 10 in the bar (defined as the sum of their available and frozen assets). Section 6.7 describes an example of a player betting screen 650.

The administrator 300, who is associated with the PBG web-site 600, will open 22, close 24 and terminate 26 the betting lines 20 for the bar's PBG, but has no further role in their game. Section 6.6 describes an example of an administrator control screen 630 (See FIG. 6).

Preferred embodiments of the four betting events 18 chosen by the bartender/captain are now described.

Figure 8B:
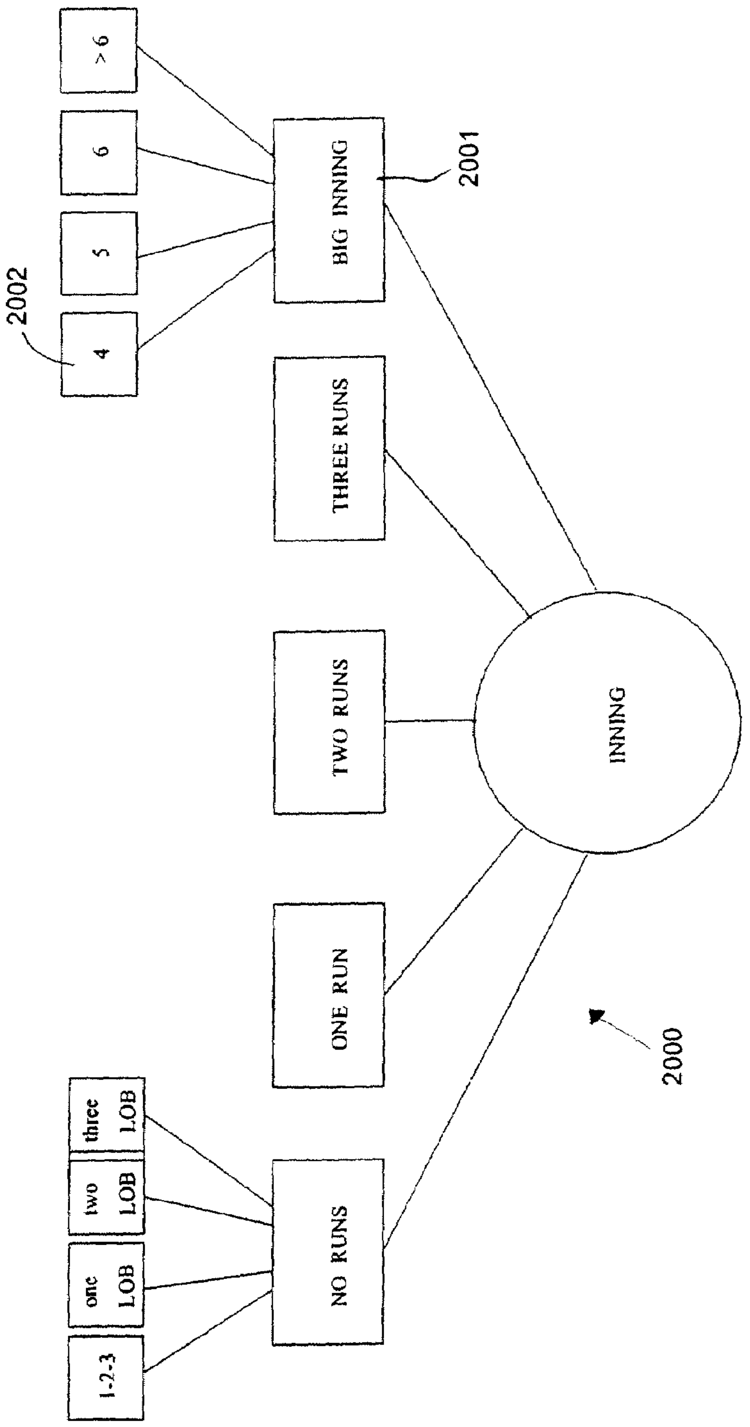
FIG. 8B is a block diagram representing a hierarchical parimutuel style payoff tree structure for a betting event based on the outcome of an inning of a baseball game.
Figure 8C:
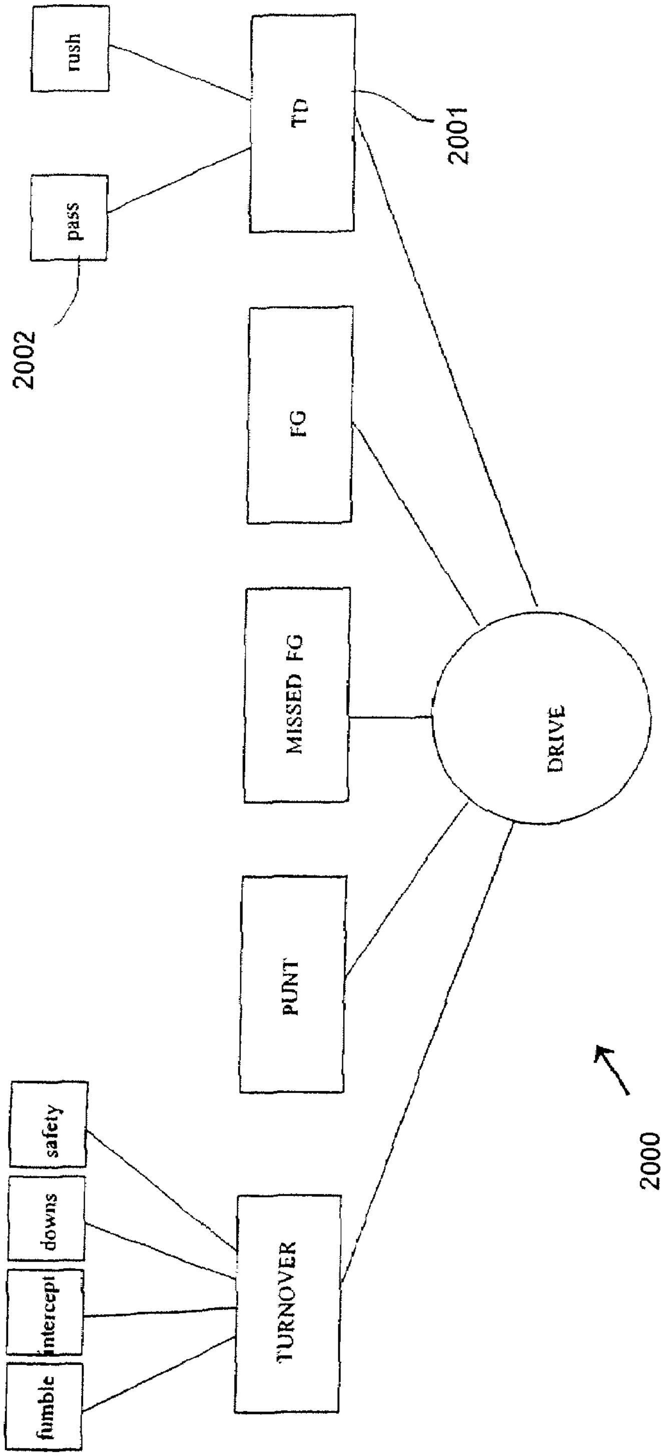
FIG. 8C is a block diagram representing a hierarchical parimutuel style payoff tree structure for a betting event based on the outcome of a drive in a football game.

Drive. A line 20 opens 22 as soon as it is official that a drive will begin, and again at each point when it becomes official that there will be a new set of downs. Each line 20 closes 24 when the next one opens, or when the drive terminates 26. The drive terminates 26 when the outcome is known. The choices are: (1) Turnover; (2) Punt; (3) Missed Field Goal; (4) Field Goal; (5) Touchdown; and (6) Clock expires. To be precise, if the driving team punts and the other team fumbles the punt, then the drive is over, ending in a punt, and a new drive begins. Also, safeties and missed fourth down attempts are considered to be turnovers. The "clock expires" choice is only sensible at the end of the half or game. The administrator 300 might choose to close a line before the current set of downs is over if the very likely outcome of the drive becomes apparent, e.g., on "3rd and 25," or if a receiver catches a pass and has a clear sprint to the end zone. In these cases there may be a short stretch of time with no open betting line. FIG. 8C is a block diagram representing a preferred embodiment of a hierarchical parimutuel style payoff structure for a betting event based on the outcome of a drive in a football game.

Figure 8D:
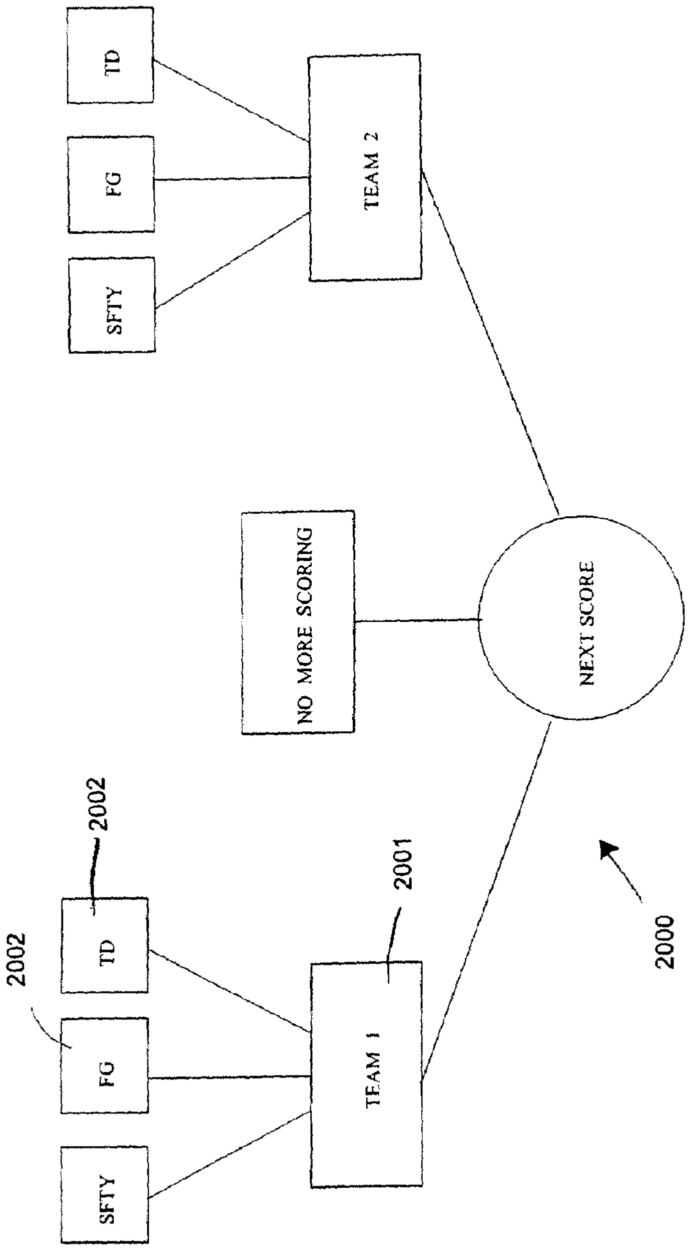
FIG. 8D is a block diagram representing a hierarchical parimutuel style payoff tree structure for a betting event based on the next score of a football game.

Next Score. A line 20 opens 22 at the beginning of the game, at the beginning of the second half, and after each drive ends. Lines 20 close 24 when the next one opens 22 and terminate 26 when a team scores and at the end of the game. The administrator 300 may choose to close 24 a line prematurely if the likely outcome becomes apparent, e.g., one of the teams is setting up to kick a short field goal. The choices are: (1) Team 1 touchdown; (2) Team 2 touchdown; (3) Team 1 field goal; (4) Team 2 field goal; (5) Team 1 safety; (6) Team 2 safety; (7) No more scoring. FIG. 8D is a block diagram representing a preferred embodiment of a hierarchical parimutuel style payoff structure for a betting event based on the next score of a football game.

Quarter TD's. A line 20 opens 22 at the end of the previous quarter (or the beginning of the PBG in the case of the first quarter, and the end of regulation in the case of an overtime game). Subsequent lines open approximately at the 10:00, 5:00, 2:00 and 1:00 marks (game clock time) of the quarter. Lines 20 close 24 when the next line opens 22. The final line 20 in each quarter closes at 0:30, but in some cases the administrator 300 can choose to improvise. The lines 20 terminate 24 at the end of the quarter. The players 10 bet on how many touchdowns will be scored in the quarter (both teams combined). The choices are preferably: (1) none; (2) one; (3) two; (4) three; (4) four; and (5) more than four.

Figure 8E:
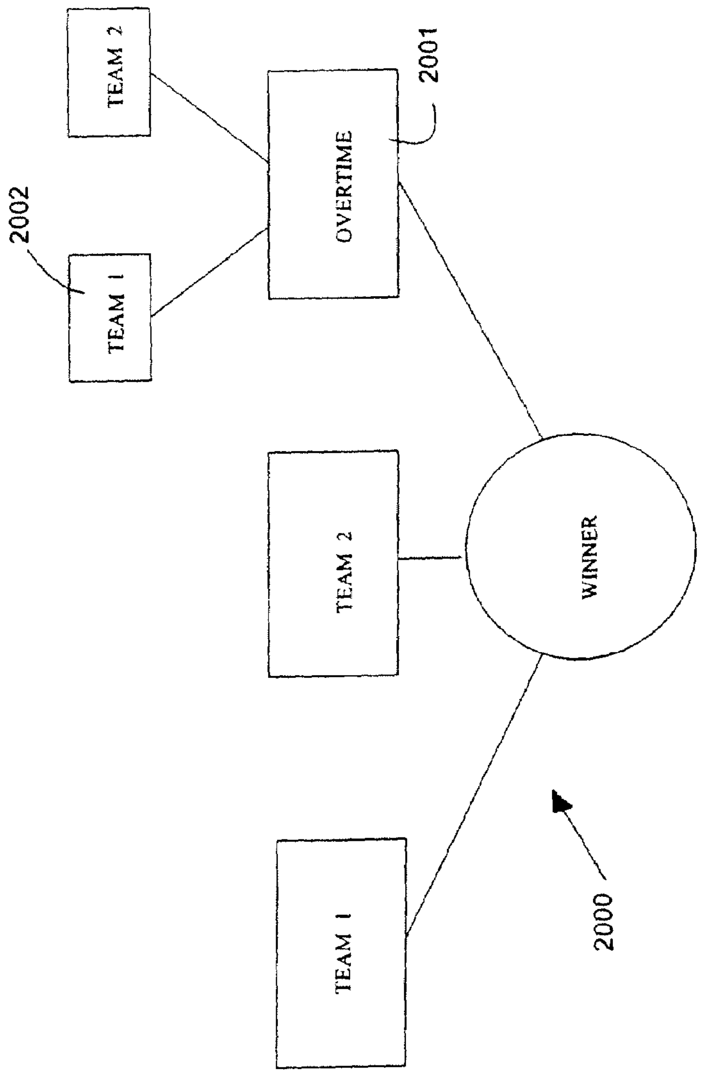
FIG. 8E is a block diagram representing a hierarchical parimutuel style payoff tree structure for a betting event based on the winner of a football game.

Winner. A line 20 opens 22 at the beginning of each quarter, each time the lead changes, and at the 10:00, 5:00, 2:00 and 1:00 marks in the fourth quarter. Each line 20 closes 24 when the next one opens 22. The 1:00 line closes at 0:30. The lines 20 terminate 26 when the game ends. If the game goes into overtime a line 20 opens 22 at the beginning of the overtime period, and new lines 20 open 22 at 14:00, 13:00, and so on until the game ends. The choices on the betting lines are simply: (1) Team 1 and (2) Team 2. Since a "tie" is so rare in football, the choice is not offered. FIG. 8E is a block diagram representing a preferred embodiment of a hierarchical parimutuel style payoff structure for a betting event based on the winner of a football game.

In general, a PBG can be described by listing the betting events 18 and betting lines 20 that will be used, and specifying when the lines terminate 26. There should be guidelines for when the lines 20 open 22 and close 24, but the administrator's 300 judgment on when to open 22 and close 24 lines 20 keeps the PBG running smoothly.

3.1 Baseball

Baseball is similar to football in the sense that the action is broken up into easily identifiable pieces. Examples of bettable events 18 include batter's turn at bat, inning, winner, next score, winning pitcher, losing pitcher, winning margin, and number of home runs.

Batter. The players 10 bet on the outcome of each batter's turn at bat. A line 20 opens 22 when the batter is about to step to the plate. A new line 20 can open 22 after each pitch, at which time the previous line closes 24. The basic choices are: (1) out and (2) not out. The choices could be elaborated (e.g., an out could be a strike out, fly out or ground out). The lines 20 terminate 26, when the player's at-bat is over. FIG. 8A is a block diagram representing a preferred embodiment of a hierarchical parimutuel style payoff structure for a betting event based on an at-bat in a baseball game.

Inning. The players 10 bet on the outcome of the half inning. A line 20 opens 22 at the end of the previous half inning, and subsequent lines 20 open 22 after the first and second outs are made. Lines 20 close 24 when the next line 20 opens 22. The basic choices are: (1) no runs; (2) one run; (3) two runs; and (4) more than two runs. Again, the choices could be elaborated significantly. The lines 20 terminate 26 at the end of the half inning. FIG. 8B is a block diagram representing a preferred embodiment of a hierarchical parimutuel style payoff structure for a betting event based on the outcome of an inning of a baseball game.

Winner. The players 10 bet on the winner of the game. A line 20 opens 22 at the beginning of the game and at the end of each half inning. Lines 20 close 24 when the next one opens 22. The basic choices are: (1) team 1 and (2) team 2. The choices could be elaborated (e.g., include the final score). The lines 20 terminate 26 when the game ends.

There are countless other betting events 18 for baseball, including: (1) next score; (2) winning pitcher; (3) losing pitcher; (4) winning margin; (5) number of home runs, and so on.

3.2 Tennis

Tennis is a natural choice for a PBG. Examples of betting events include winner of game, winner of set, and winner of match.

Game. The players 10 bet on who will win each game. A line 20 opens 22 at the end of the previous game (or at the beginning of the match in the case of the first game) and after each point. Lines 20 close 24 as soon as the server hits his/her first serve. The basic choices are: (1) player 1; or (2) player 2. The choices could be expanded to include the game score. The lines 20 terminate 24 when the game is over.

Set. The players 10 bet on who will win the set. A line 20 opens 22 at the beginning of each game in the set. The lines 20 close 24 at the end of the games, unless the game could be the last one of the set. In that case the line 20 closes 24 after the third point of the game (or tie breaker). The basic choices are: (1) player 1; (2) player 2. The choices could be expanded to include the score of the set.

Match. The players 10 bet on the winner of the match. A line 20 opens 22 at the beginning of each game and closes 24 at the end of the game, unless the game could be the last one of a set. In that case the line closes 24 after the third point of the game (or tie breaker). Here it is probably appropriate to bet on the winner and the number of sets needed. For example in a best of three sets match the choices would be: (1) player 1 in straight sets; (2) player 2 in straight sets; (3) player 1 in three sets; (4) player 2 in three sets.

3.3 Basketball; Hockey; Soccer

Sports like basketball, hockey and soccer do not have as many natural break points for opening 22 and closing 24 lines 20 as football, baseball and tennis do. Nevertheless, an interesting PBG can be designed for these sports too. Possible betting events for basketball include: (1) next score; (2) lead change; (3) quarter scoring; (4) high scorer; (5) high rebounder; (6) next foul; (7) point spread; (8) over-under.

3.4 Horse Racing

It is interesting to consider how new technology can change an old pastime. Typically, all betting on horse races is done prior to the beginning of the race. However, if the crowd at a horse race has Internet access (e.g., with a laptop computer, palm pilot, or cell phone) then they can play a PBG 1 based on the race. Betting events 18 may include: (1) win; (2) place; (3) show. The betting choices 80 for each event 18 is the list of horses (i.e. participants) in the race. For each event 18 the first line 20 opens 22 before the race and closes 24 when the race begins. This could be called the "conventional" line. After the race begins, however, new lines 20 can open 22 as the race proceeds, for e.g. every 15 seconds until the end of the race. Lines 20 close 24 as soon as a new one opens 22. The bonus 30 for the conventional line 20 should be the largest one, and the size of the bonuses 30 preferably decreases as the race progresses. This way players 10 that guessed correctly early in the race have an advantage. A race track could use the basic PBG idea, but impose a "negative bonus" of, for example, 15% on the player wagers in order to make a profit. The foregoing principles can be applied to other racing events, such as human track and road running events, automobile races, and dog races.

3.5. PBG Games for Determinate Events, Such as Trivia Games

3.5.1 Trivia or Quiz Game Version of a PBG

Figure 7C:
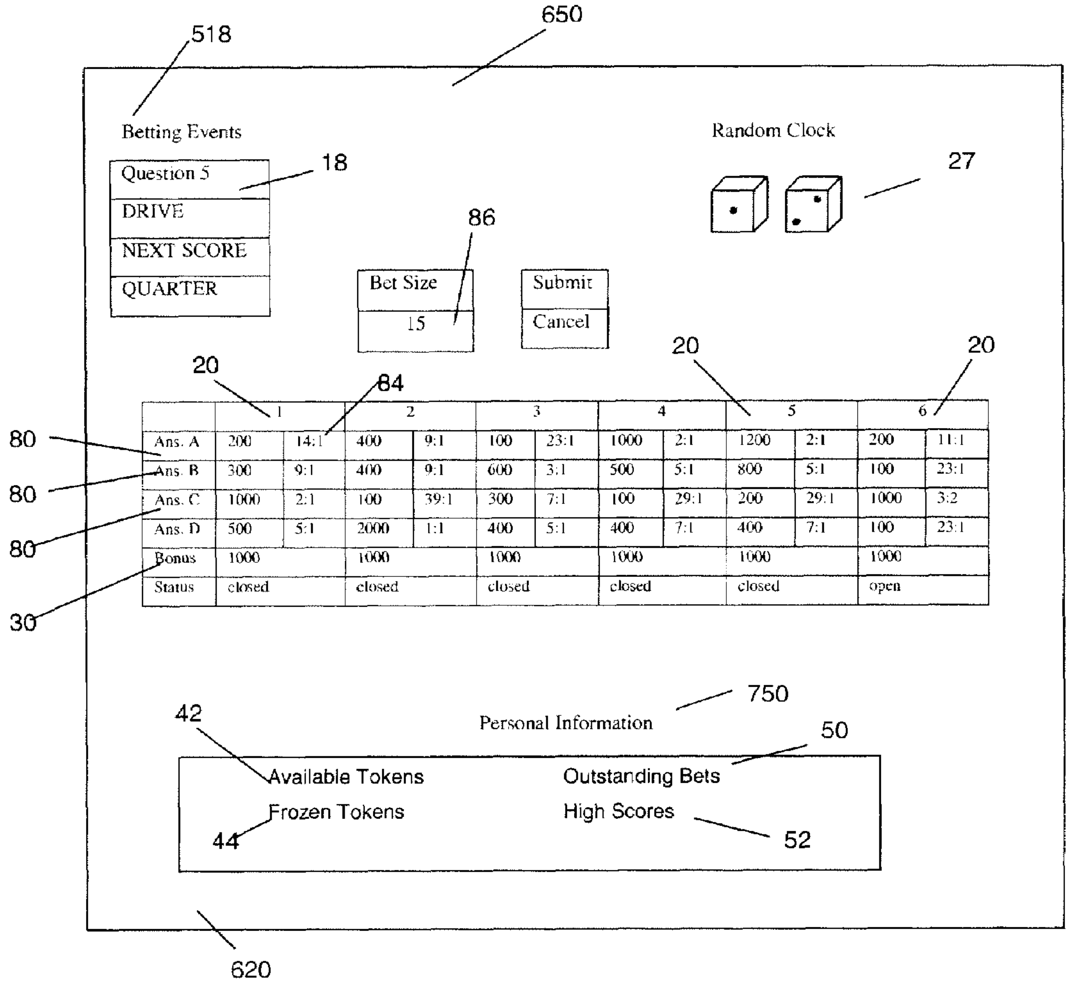
FIG. 7C is one preferred embodiment of a player betting screen for a determinate sporting event, featuring a betting screen for a trivia game.

In a pure trivia game version of a PBG, players are presented with questions. As shown in FIG. 7C, questions are preferably presented in a multiple choice format, though it is possible to use other formats such as true-false or matching. Each question is a betting event 18. In a trivia PBG, each betting event 18 can be referred to as a "Trivia Event Betting Line," as opposed to a "Live Viewed Event Betting Line" in the case of indeterminate sporting events. Players bet on the outcome or choice 80 of the event, i.e. typically answer A, B, C or D. In this sense, the trivia game itself is in the nature of a "live" sporting event, because players are wagering on possible outcomes of subsets (i.e. questions) of the trivia game. Similarly to, for example, a drive in a football game, players do not necessarily know whether the correct outcome 18 of the Trivia Event Betting Line will be answer A, B, C or D. However, a trivia game or another form of a determinate sporting event differs from a live sporting event in that the answers are known in advance to at least the administrator and, in most cases, to at least some of the players.

In the preferred embodiment, the quiz game version of the PBG consists of players with terminals (PC, laptop, palm pilot, cell phone, or special purpose device) viewing betting lines 20 corresponding to the quiz questions. Each question has its own betting line. For example, a betting line for "How many home runs did Babe Ruth hit?" might have choices: (a) 284; (b) 488; (c) 557; (d) 714; (e) 932; (f) 1241. Players wager on the choices. The current odds 84 on each choice are displayed on the players' terminals. As with all PBG's, players can bet as much as they want, whenever they want, on as many choices as they want (as long as they have the liquid assets to cover their bets) while the betting line 20 is open.

Figure 8F:
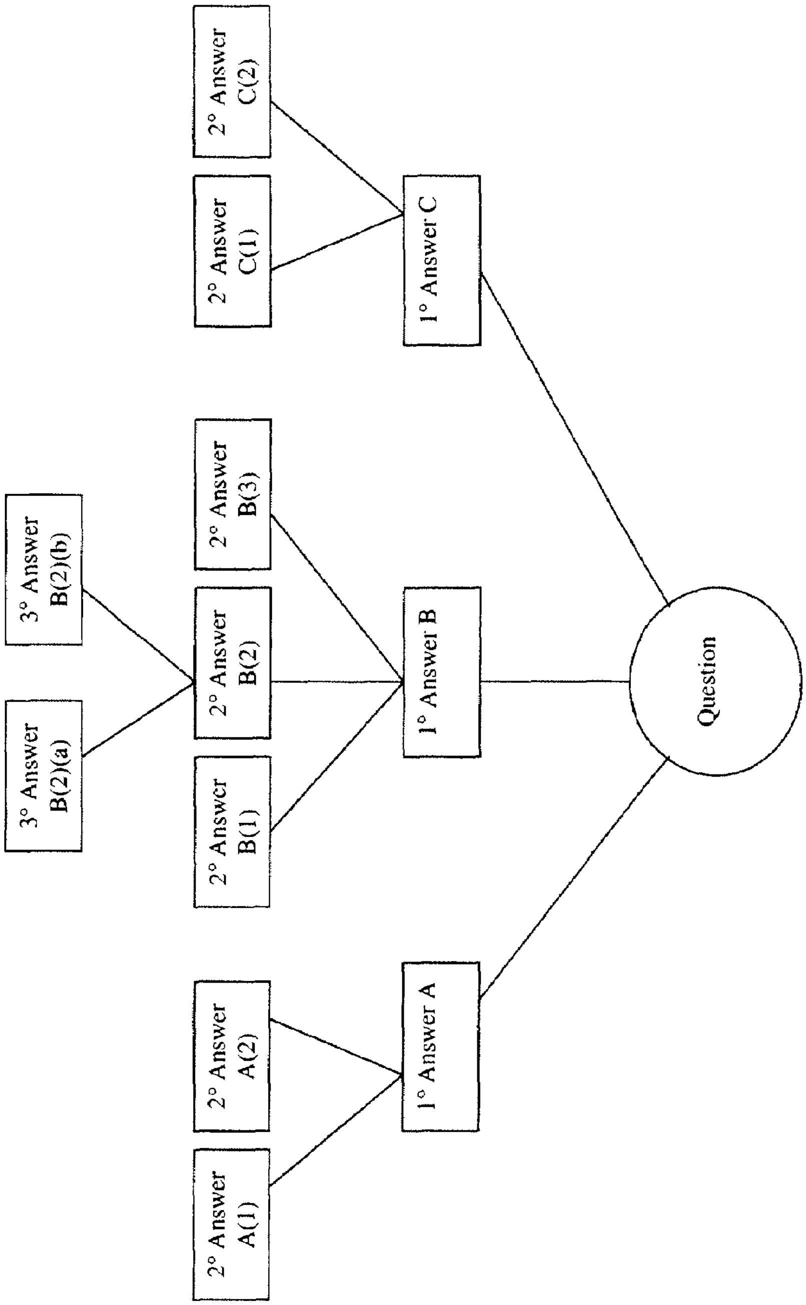
FIG. 8F is a block diagram representing a hierarchical parimutuel style payoff tree structure for a betting event based on a determinate sporting event, such as a trivia question.

The choice sets can have a hierarchical structure (hierarchical PBG structures are described in Section 4, below). For example, in the example above there could be two primary choices: (A) Less than 600 or (B) More than 600, with items (i), (ii), and (iii) as subchoices of (A), and items (iv), (v) and (vi) as subchoices of (B). An example of a hierarchal structure for a trivia question is shown in FIG. 8F.

The trivia/quiz game PBG can use tokens with no monetary value or can be played as a gambling game (perhaps in a casino room similar to the "sports betting room for PBG's" described below). Multiple lines 20 can open and close before terminating a betting event 18, as with a sports PBG. When the "time is up" the lines 20 terminate and the players with correct answers are paid off. The payoff odds can be the closing time odds or "locked-in odds" (described below).

One difference between a PBG game based on a determinate sporting event and a PBG game based on a live or indeterminate sporting event is that in a determinate PBG, the correct outcome is known in advance by at least the administrator. Additionally, one or more of the players may know the correct answer. In live sporting events, jury trials and elections, the outcome is not known in advance. This difference has little or no bearing on the rules of the game, but it dramatically alters the players' strategies. In a determinate PBG, players who know the correct answer to a question are in an interesting contest with the players who do not know the answer. Players who know the correct answer would prefer that everybody else bets on wrong answers so as to increase their payoff, so they may bluff or try other tactics. When a player knows the answer, the ideal tactic would be to wait until the last possible moment to place a bet on the correct answer. However, the use of a random clock 27 (discussed in further detail below) prevents this strategy from working very well; if the player waits too long to bet, the random clock 27 may shut off the betting line before the player places a bet. On the other hand, Players who do not know the correct answer can attempt to gain information about the correct answer by watching the betting activity of the other players (via the posted odds). Trivia buffs will have an advantage in playing the game, but careful betters can find ways to profit from the knowledge of others. As with a live sports PBG, a determinate PBG game is more interesting if the house supplies a bonus 30 to the pot, so as to entice all players to place a bet on each betting event. If a player knows the correct answer but waits too long to place a bet, he or she will effectively lose at least a portion of the bonus.

3.5.2 Combination of Trivia and Indeterminate Viewed Event

In a determinate version of the PBG game, the sporting event is preferably the trivia game itself. One of the nuances of this invention is that the trivia based PBG game can be played as an accompaniment to another event in order to generate interest and participation in the event. For example, during a football game, the viewers could participate in a PBG game based on football trivia. During the broadcast of a television show (e.g. a soap opera), the viewers could participate in a PBG game based on trivia related to the television show. This type of PBG game combines Trivia Event Betting Lines with Indeterminate Viewed Event Betting Lines.

3.5.3 Combination of Trivia and Determinate Viewed Event

In an alternative embodiment of the determinate PBG game, the sporting event is a replay of a previously held event, such as a rerun of a football game, movie, or television show. As can be appreciated, a replay of an event is similar to a trivia game, in that the players are tested on their knowledge or recollection of known outcomes. Additionally, the characteristics of these two embodiments can be combined. For example, during the replay of the sporting event, some betting lines can be directed toward trivia questions (i.e. "Trivia Event Betting Lines") while other betting lines can be directed toward events that are occurring during the replay (i.e. "Determinate Viewed Event Betting Lines"). In a PBG involving a replay of Super Bowl III, one betting line might depend on the outcome of drive number 4, while another betting line might depend on the answer to the question "What college did Joe Namath play for?" or "What was the first movie Joe Namath starred in?" or "Who was the President of the United States during Super Bowl III?" In this embodiment, Trivia Event Betting Lines and Determinate Viewed Event Betting Lines can be run simultaneously. One of the advantages of using both Trivia Event and Determinate Viewed Event betting lines is that the strengths of different players can be assessed. For example, a football fanatic might do well on Determinate Viewed Event Betting Lines while a person who is well versed in entertainment or history trivia might do better on Trivia Event Betting Lines, thus leveling the playing field.

3.5.4. Internet PBG Game Based on Determinate Sporting Events

The multi-person PBG game based on determinate sporting events can be provided over the Internet. Players can be allowed to play for free, or can be charged a fee. When a betting line 20 opens players can place bets whenever they want, on whatever they want, and for as much or little as they want, just as with a sports PBG. Players have access to the current odds and pools on the choices and are free to use that information as they see fit. The betting lines 20 close after a random time, and the winners are paid off. If the odds on the choices do not appear to be settling down, the administrator may close a betting screen and open a new one, before the random clock 27 (described in Section 6.8 below) goes off. The winner is the player with the most tokens 40 at the end of the game (e.g., after 10 trivia questions).

3.5.5. Casino Gambling Game Based On Determinate Sporting Events

The casino gambling version of the trivia PBG is essentially identical to the free internet game, except that each player is betting with his/her own money, against the other players. The house cannot lose money, no matter how good the players are, due to the parimutuel payoffs. The "house" could be an online or traditional casino.

3.5.6 TV Game Show Trivia PBG

The TV game show is essentially identical to the free internet game, except that all the players are in the same room (auditorium), and can therefore interact with each other, with the game "host", and/or the "studio audience." The betting screens are seen by the players, studio audience, and TV viewers; but only the players' bets affect the odds and pools on the betting screens. An Internet-based play-along version can be provided for television viewers. The poker-like strategies needed to play the game well, and the obvious advantage for serious trivia buffs, would make an interesting television show. On the other hand, poker or trivia skills are not required in order to play, since players can attempt to "steal" answers from other players. Unlike traditional game shows, the number of players can be very large. The TV cameras can zoom in on selected players, such as points leaders. A slightly modified version allows players (and the TV audience) to see exactly what certain individual players are doing. This twist intensifies the "poker" aspect of the game.

4. Hierarchical Parimutuel Style Wagering

In many of the betting events 18 described in the previous sections, the basic choices 80 could be divided into subchoices which would make interesting bets themselves. For example, the batter betting event in a baseball game has two primary outcomes 2001: SAFE and OUT. These two options branch into numerous possibilities 2002, and some of those possibilities can branch further 2003, as illustrated in FIG. 8A. Of course, if one player 10 places, for example, ten tokens on a particular choice 2001 and a second player 10 places 10 tokens on a subchoice 2002 of that choice 2001, the second player 10 should get a higher payoff than the first player 10 if they both win, since the second player 10 took a greater risk and made a more courageous bet. For example, the first player 10 might bet on "OUT" 2001 and the second player 10 on "GROUND OUT" 2002. If the batter strikes out, the first player 10 is a winner and the second player 10 is a loser. However, if the batter does ground out then both players 10 are winners, and the payoff scheme should reward the second player 10 for making a more courageous bet. This section describes a method for determining payoffs for hierarchical choice sets that retains the flavor of a parimutuel style.

To begin, we need to develop a notation for hierarchical choice sets. For a given betting event 18 we will number the choices from 1 to c. There is also a choice 0 that corresponds to the betting event 18 itself. The hierarchical structure is specified by a function $P(l), l=1, 2, \ldots, c$, where $P(l)$ is interpreted as the "parent" of choice t. In other words, if $l_1$ is one of the subchoices of $l_2$ then $P(l_1)=P(l_2)$. If l is one of the "primary" choices (e.g. SAFE or OUT) then P(l)=0. The leaves 2010 of the tree 2000 are the choices that have no subchoices. A subtree of the betting line is a choice 2001 along with all its "descendants" 2002, 2003. For example, in FIG. 8A the choice HIT 2002 along with its subchoices SINGLE, DOUBLE, TRIPLE and HOME RUN 2003 constitutes a subtree. The subbets of choice l is the set of all "descendants" of t. For example, in FIG. 8A, the choice OUT has four subtrees, three of which are simply leaves 2010. Let $L_l$ be the "level" of choice l defined to be the number of "generations" it is from choice 0. For example in FIG. 8A, L(SAFE)=1 and L(HOMERUN)=3. Each choice l that is not a leaf has a bonus $b_l \geqq 0$ associated with it. The tokens bet on the subtrees of l, plus the bonus $b_l$, becomes the pot for choice l, which is split between the players 10 with bet(s) in the winning subtree of l (if there is one). Of course, if l is not a winning choice than all the players 10 betting on l or any of its descendants lose their bets. The question remains: How is the pot for choice l split between the players 10 when it is a winning choice?

The basic winning choice is the choice with the highest level among the winning choices. For example, in FIG. 8A, if a batter hits a home run then SAFE, HIT and HOME RUN are all winning choices, and HOME RUN is the basic winning choice. The basic winning choice is typically a leaf 2010, but does not have to be. For example, if a batter is "hit by a pitch" then SAFE would be the basic winning choice since the precise outcome does not appear in any of the subtrees. Any bets in the subtrees of SAFE would be losers. Clearly l is a winning choice if and only if it is the basic winning choice or is an "ancestor" of the basic winning choice. In other words, there is a unique path from the basic winning choice, "down the tree," to choice 0. The payoffs are calculated by climbing down the tree from the basic winning choice, one generation at a time, until choice 0 is reached, using the recursive algorithm described next.

Let $l^*$ be the basic winning choice, and for each l let subbets(l)=total number of tokens bet on subbets of l (always 0 if l is a leaf).

bets(l)=total tokens bet on l itself.

wager(n, l)=total tokens bet on l by player n.

Bonus(l)=bonus(l) if subbet(l)>0, and 0 if subbet(l)=0.

One cannot bet on the betting event itself, so wager(n, 0)=0. To calculate the payoffs, begin with the "zeroth" stage at choice $l_0=l^*$ where we set $$\text{share}(n,l_0)=\text{wager}(n,l_0).$$

The first stage is a choice $l_0=P(l_0)$ and we set $$share(n, l_1) = \frac{share(n, l_0)}{bets(l_0)}[subbets(l_1) + Bonus(l_1)] + wager(n, l_1)$$

If $L(l^*=1$ then $l_0=0$. Player n receives share(n, 0) tokens, interpreted as his share of the pot for the betting event. The nature of the hierarchical parimutuel style payoffs emerges when $L(l^*)>1$, and share(n, 0) needs to be calculated recursively. Let $l_2=P(l_1)$ and set $$share(n, l_2) = \frac{share(n, l_1)[subbets(l_2) + Bonus(l_2)]}{bets(l_1) + subbets(l_1) + Bonus(l_1)} + wager(n, l_1)$$

In general, once we have calculated share(n, $l_{k-1}$) we obtain share(n, $l_k$) by $$share(n, l_k) = \frac{share(n, l_{k-1})[subbets(l_k) + Bonus(l_k)]}{bets(l_{k-1}) + subbets(l_{k-1}) + Bonus(l_{k-1})} + wager(n, l_k)$$

The process ends at stage $L(l^*)$. Player n wins share(n, 0) tokens, which are immediately available for placing new bets, and forfeits the tokens that were frozen on the betting line. Note that at each stage, if we sum the "shares" of all the players 10 we get $$\sum_n share(n, l_k) = bets(l_k) + subbets(l_k) + Bonus(l_k)$$

(This can be proven by mathematical induction). Thus, the bonuses on choices give the players 10 with bets on subchoices a larger share of the pot, but only the bonus at choice 0 translates directly into tokens.

A useful set of statistics for players 10 looking to place bets are the "odds" on each choice. In the hierarchical parimutuel system the odds on choice 1 is defined to be $$odds(l) = \frac{subbets(0) + bonus(0)}{bets(l) + subbets(l) + Bonus(l)} \prod_{k=1}^{L(l)-1} \frac{subbets(P^k(l)) + Bonus(P^k(l))}{bets(l) + subbets(P^k(l)) + Bonus(P^k(l))}$$

5. A Mathematical Characterization of the Invention

The football PBG described in section 2 is one of many possible football PBG's. There are as many kinds of betting events 18 for football as one's imagination will allow, and any subset of them can be used in a football PBG (e.g., the event menu in FIG. 2). Furthermore, virtually any sporting event can be used as a basis for a PBG; all that is needed is an interesting set of betting events 18. What all these versions of the basic PBG have in common can be pinpointed very nicely using the mathematical language used to study stochastic processes. See e.g., Sheldon M. Ross, *Introduction to Probability Models* (sixth edition), Academic Press, 1997. A stochastic process is a random phenomenon that unfolds over time. The precise details of the unfolding of a indeterminate sporting event are impossible to predict with certainty, so sporting events are stochastic processes. A PBG (which consists of a sporting event along with all the accompanying wagering) is also a stochastic process. In this context, the time variable t is "real time" (the time on your watch), and not the "game clock time" that might be used in the sporting event (e.g., in football or basketball). By convention, t=0 corresponds to the beginning of the game. Stochastic processes are specified by three mathematical objects, typically denoted ($\Omega$, $F_t$, P), where:

$\Omega$ is a "sample space"; the set of all possible outcomes of the stochastic process. In our case this is the set of all possible unfoldings of the PBG; typically an infinite set, but one whose structure is known implicitly from the rules of the sport and the betting events of the PBG. In our treatment here, there is no need to describe $\Omega$ in detail. Each sport has its own sample space.

- $F_t$ is an "increasing σ field" of subsets of Ω. In lay terms, the elements of $F_t$ in our case correspond to the information about the PBG available to the administrator 300. In particular, it includes all information about the sporting event available to somebody watching it on television. In other words, if somebody watching the game on television can answer yes or no to a question about whether or not some event occurred in the game, that event would be an element of $F_t$ for some t. The elements of $F_t$ therefore specify which betting events and betting lines are allowable, and when lines can open, close and terminate. $F_t$ is usually a very large (possibly infinite) set, but one whose elements are known implicitly in terms of the information available to a viewer of the sporting event. For a fixed t an event is in $F_t$ if it is decided by time t.
- P assigns a probability to each event in $F_t$, $t \geqq 0$ in a way that is consistent with the axioms of probability. (For example, the probability that either event "A" or "B" occurs is the sum of their respective probabilities if they cannot both occur.)

Sporting events are fun and interesting to bet on because nobody really knows P. Not only do we not know which unfolding in Ω will occur, we do not even know how to assign probabilities to most events in a reliable manner. (In baseball, a batting average is an attempt to assign a probability to the event that a batter gets a hit). Of course some people are better at guessing P than others, and they have an advantage over their peers in sports betting. For the purposes of defining a PBG there is no reason to assume that P is known or even knowable.

A (discrete) random variable X is called $F_t$ measurable if for every x, the event X=x is an element of $F_t$. For example, the number of points that team 1 will have at time s is an $F_t$—measurable random variable if $s \leqq t$, but it is not $F_t$—measurable if s>t. In a PBG, the random variables correspond to the possible outcomes on the betting lines.

Let us refer to the jth betting line of the ith betting event as "line ij." Suppose we can identify random variables $o_{ij}$, $c_{ij}$, $\tau_{ij}$ and $X_{ij}$ interpreted as the times line ij open, close and terminate, and the outcome of line ij, respectively. Let liquid(n, t) and frozen(n, t) be the number of tokens the nth player has available and frozen (respectively) at time t.

Expanding the notation from the previous section slightly, we define subbets(i, j, l)=total number of tokens bet on subtrees of choice l on line ij.

bets(i, j, l)=total tokens bet on choice l of line ij.

wager(i, j, n, l)=total tokens bet on choice l of line ij by player n.

total(i, j, n)=$\Sigma_1$ wager(i, j, n, l)=total tokens bet on line ij by player n.

bonus(i, j, l)=bonus on choice l of line ij.

Bonus (i, j, l)=bonus(i, j, l) if subbets(i, j, 1)>0, and 0 if subbets(i, j, 1)=0.

Suppose $l^*$ is the basic winning choice on line ij. Let $$l_0=l^*,\ l_1=P(l_0),\ l_2=P(l_1),\ \ldots\ l_K=0=P(l_{K-l})$$

be the "chain" of winning bets (i.e. $L(l^*)=k$), and compute $$\text{share}(i,j,n,l_0)=\text{wager}(i,j,n,l_0)$$

and for r=1, 2, . . . , k, $$share(i,\ j,\ n,\ l_r) = \frac{share(i,\ j,\ n,\ l_{r-1})}{bets(i,\ j,\ l_{r-1})} + \frac{[subbets(i,\ j,\ l_r)}{subbets(i,\ j,\ l_{r-1})} + \frac{Bonus(i,\ j,\ l_r)]}{Bonus(i,\ j,\ l_{r-1})} + wager(i,\ j,\ n,\ l_r)$$

Player n wins share(i, j, n, 0) tokens when line ij terminates.

We can now define a PBG mathematically. Let) denote a small time interval. Recall that if a line closes before it terminates then a new line immediately opens, and if a line terminates before it is closed then it immediately closes and a new line does not immediately open. This can be summed up by $$\text{If } c_{ij}<\tau_{ij} \text{ then } o_{i,j+1}=c_{ij}+\Delta<\tau_{ij}=\tau_{i,j+1} \tag{1}$$

$$\text{If } \tau_{ij}<c_{ij} \text{ then } c_{ij}=\tau_{ij}+)<o_{i,j+1}. \tag{2}$$

The termination time of an event is the instant that the outcome of the event 18 becomes known with certainty. This can be expressed by $$X_{ij} \text{ is } F_t\text{-measurable} \Longleftrightarrow \tau_{ij}. \tag{3}$$

The parimutuel style betting is summed up by specifying what happens to each player's 10 available and frozen assets when a line terminates. Let share(i, j, n, 0) be the quantity calculated iteratively via (5.4). Then $$\text{liquid}(n,\tau_{ij}\Delta))=\text{liquid}(n,\tau_{ij})+\text{share}(i,j,n,0) \tag{4}$$

$$\text{frozen}(n,\tau_{ij}\Delta))=\text{frozen}(n,\tau_{ij})-\text{total}(i,j,n) \tag{5}$$

It should be pointed out that (1)-(5) say nothing about "house rules," such as: how the winner(s) are to be chosen; how the bonuses are set; how tokens are distributed to the players 10; the information available to the players 10 (e.g., token counts, high scores, etc.); the nature of the communication between players 10 and administrators 300. In a "private PBG" the "captain" chooses the house rules from a menu (section 6.2). In an "open PBG" (section 6.1), the administrator 300 determines the house rules, which can therefore be much more flexible.

A person trained in stochastic processes should be able to easily determine whether or not a given betting game is a PBG. Anybody trained in stochastic processes can also construct a betting game that is obviously very similar to a PBG, but "technically" is not a PBG because one or more of (1)-(5) are approximate, and therefore (technically) not satisfied. Properties (1)-(5) taken together describe (precisely) a "class" of sports betting games. This is the invention described in this disclosure. A "close approximation" to the invention would have to be considered an instance of the invention. No matter what kinds of house rules are used, the betting game is a PBG as long as (1)-(5) are satisfied, or approximately satisfied (quantitatively or qualitatively). For purposes of the present application, a determinate sporting event will be considered to fulfill the requirements of a stochastic process, because although the outcome of each betting event is known, the players perceive the event as an indeterminate event.

6 Figures and Diagrams

6.1 PBG's Played Over The Internet

As indicated in FIG. 1, players 10 log onto a PBG web site 600 through their web browsers and download a client program to play the PBG 1. In an indeterminate version of the PBG game, the PBG is associated with a specific sporting event (e.g., the Super Bowl), so all the players 10 are watching the same game. Players 10 could be at home, at a sports bar, or even at the sporting event itself. Games can be "private" (e.g., a few players 10 watching at home, or the patrons of a sports bar), or "open" to anybody with Internet access. The PBG administrator(s) 300 are also connected to the PBG web-site. A single administrator 300 can control all the private games as well as the open contest simultaneously since the open, close and terminate times are the same for everybody.

6.2 Private PBG's

Figure 2:
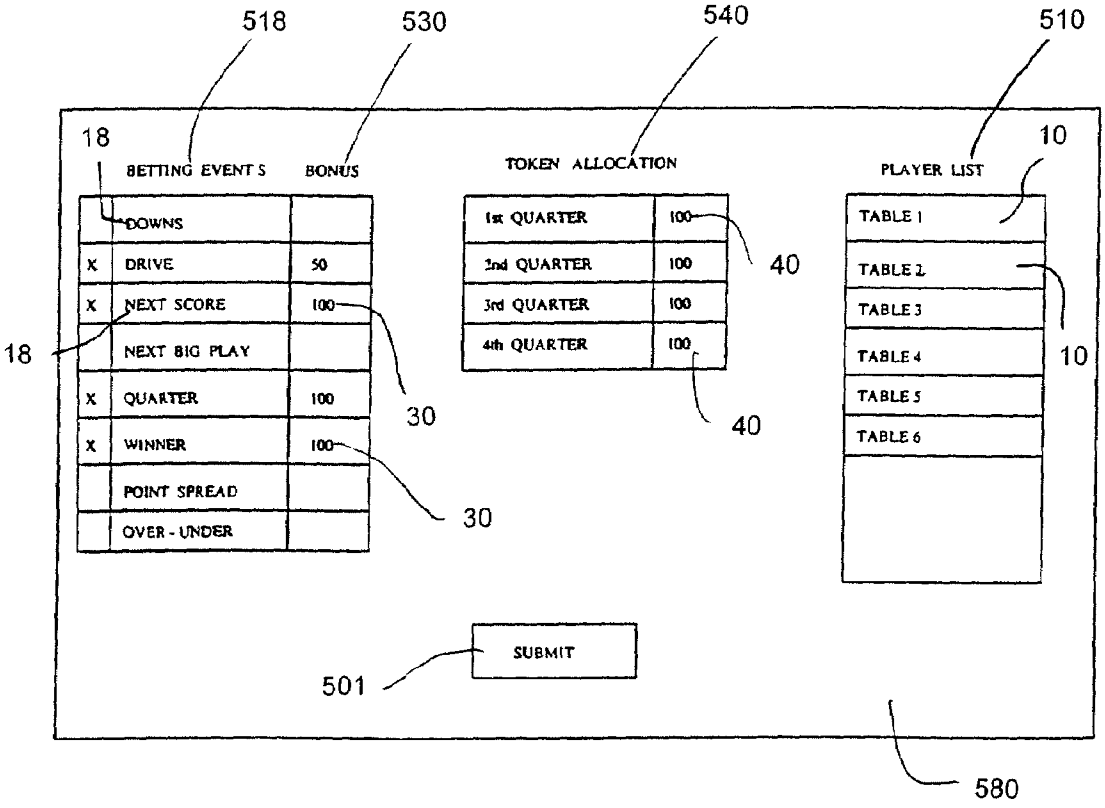
FIG. 2 is one preferred embodiment of a captain's screen for selecting parameters for playing the PBG.

A group of players 10 can play a private PBG 500 between themselves and can customize the house rules somewhat using the administrator 300 at the PBG web-site 200 to control their game. After logging on to the PBG web-site 200, a designated captain, who may be one of the players 10, requests the captain's screen 580 and uses the screen 580 to set up the game for the private group 500 of players 10. A preferred embodiment of a captain's screen 580 is shown in FIG. 2. The information needed to set up a private game 500 includes: a list of the players 510; list of betting events 518; a default bonus size for the betting lines 530; and the allocation of tokens 540 given to the players 510. FIG. 2 shows an example of a completed captain's screen 580 for the football PBG from section 2. There is an area to list the players 10 in the group 510 (named table 1 through table 6 in FIG. 2), a checklist for betting events 518, and menus for the bonus 530 and token allocation 540 specifications. Once the set up information has been entered on the captain's screen 580, the captain submits the information by hitting a submission icon 501 on the captain's screen 580. Players 10 that do not request to be part of a private PBG 500 play in the open PBG 400 by default.

6.3 Basic PBG Web Site Software Architecture

Figure 3:
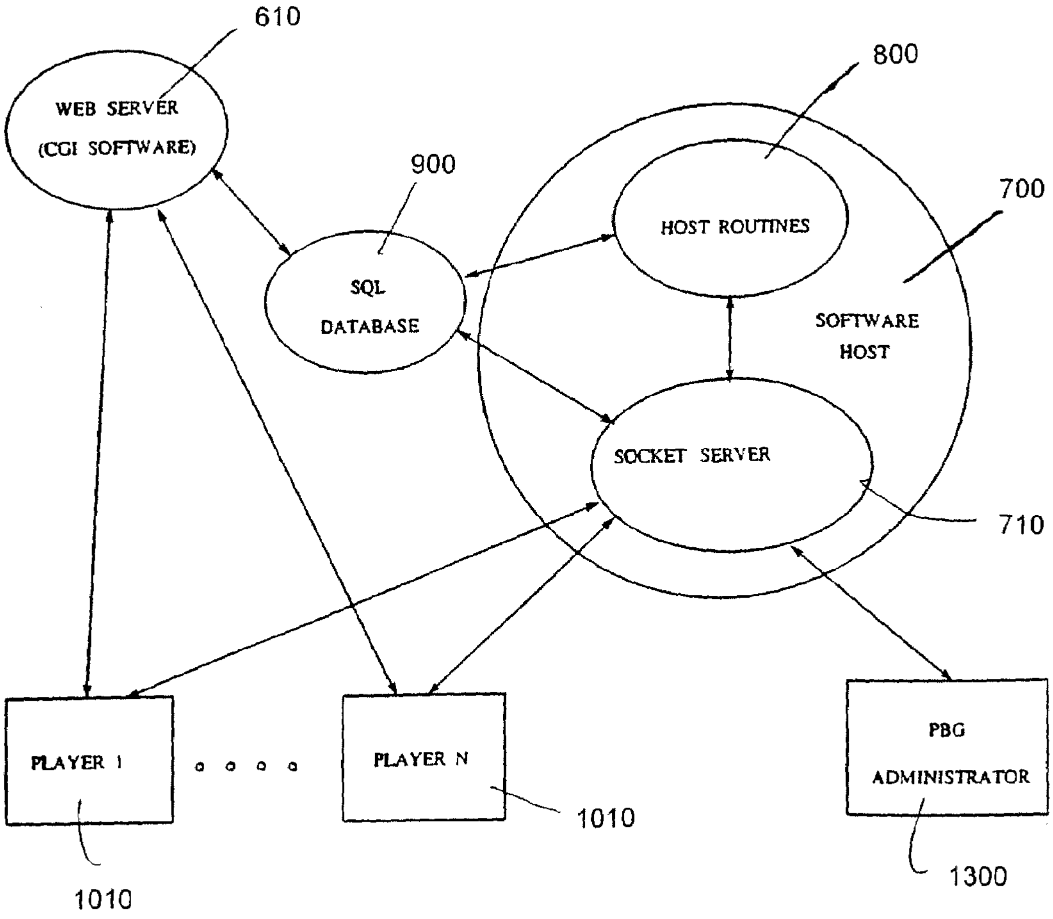
FIG. 3 is a block diagram representing one preferred embodiment of web-site software architecture for the PBG.

FIG. 3 shows the basic PBG web site software. The PBG Web Site 600 (see FIG. 1) services all players 10 and administrator(s) 300 through a single host computer 200. The host computer 200 will support three primary software components: (1) the PBG WebServer CGI software 610; (2) the PBG Socketserver 710 and Software Host 700 module; and (3) the SQL database 900. The web-site CGI software 610 is responsible for downloading all of the interface screens 620 (see FIG. 6) to the players 10 and administrators 300. The Socketserver 710 is responsible for all socket-based real time communications between the players 10, administrators 300 and other software host modules 700, 710, 800, 900. These communications will include betting actions 730, broadcast messages 740, etc. (See FIG. 7B). In addition, the Socketserver 710 sends personal information 750 (see FIG. 7A) to the players 10 from time to time. Personal information will include items such as token counts, error messages, etc. This information is generated by the system and does not require administrator 300 oversight. The Host Routines 800 are responsible for all of the bookkeeping functions required by the software host 700. These functions are described in section 1 and illustrated in FIG. 5. The administrators 300 and players 10 are all assigned an identification number. The Socketserver uses this identification number to ensure that the players 10 are linked to the appropriate administrator 300 if the PBG web-site 600 services more than one sporting event. The SQL database 900 will hold the player's login information. This may include information like login handle and past betting history. This information is accessed and changed by both the CGI webserver software 610 and the Socketserver 710, as required.

6.4 Player/Administrator Browser Page

Figure 4:
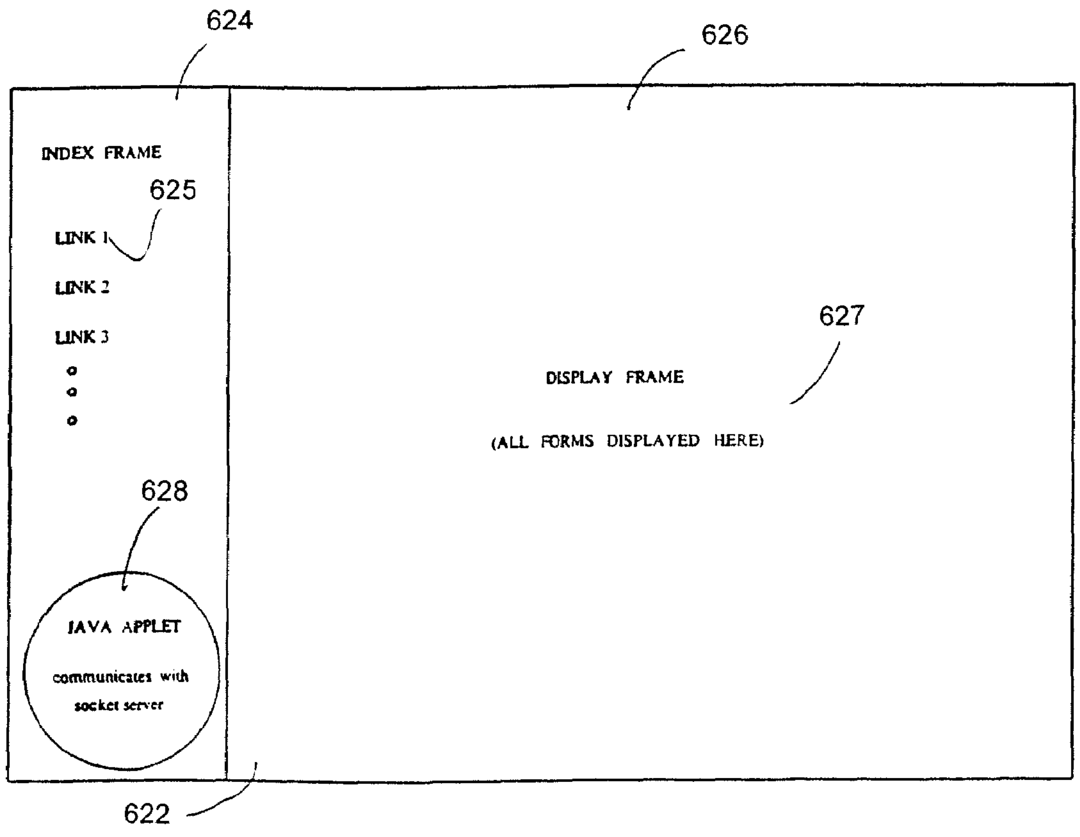
FIG. 4 is one preferred embodiment of a player/administrator browser page.

The player/administrator browser page 622, such as the one shown in FIG. 4, is responsible for all communication between the clients' browsers 1010, the webserver CGI code 610, and the PBG Socketserver 710. To do this, the PBG browser page 622 has two frames, which are the Index 624 and Display 626 frames. The Index frame 624 displays the links 625 to the pages associated with a specific action. When the user selects a link 625, the associated display page 627 is displayed in the Display frame 626. In cooperation with the Browser Index frame (see FIG. 4), the java applet 628 handles all real-time socket-based communication between the PBG socketserver and the form in the browser page's Display frame. These fields may include results of player's betting actions, etc. This is effected in the following way.

"Sockets" are like software telephone lines. They are used to pass data from one independently running process in the PBG betting system 1 to another. This is the standard means for passing information between independent processes in computers. Java is a programming language used in conjunction with Internet browsers. The java applet establishes a socket connection with the socketserver 710 and enters into a processing loop. Inside this loop, the java applet 628 continually checks for new messages from the Socketserver and information from the Index frame DHTML script code. When the java applet 628 gets messages from the socketserver 710 it passes them on to the Index frame 624, and vice versa. The mechanics of this information hand-off are described in more detail below.

Display Frame Page to Socketserver

"DHTML script" is a set of instructions to the browser, written in a scripting programming language. DHMTL Script code in the index frame 624 checks the contents of the display frame page 626's form fields 627 about once every second. If the contents of any of the form fields 627 have changed, the index frame 624 script code passes the contents of the changed field and the form field's ID to a function in the java applet 628. The java applet function 628 stores the form field information into a temporary storage area. Once every cycle, the applet 628 processing loop checks the form field storage area. If it finds new stored data, the applet 628 constructs a message and sends it to the SocketServer 710 via its established socket connection. Once the message is sent, the processing cycle clears the field information storage area, and starts checking for new data sent from the Index frame 624's script code.

Socketserver to Display Frame Page

In each cycle of the processing loop, the applet 628 checks for messages from the socketserver 710 on its established socket connection. If it finds a new message, it parses the message information into form field ID and form field information. Next it stores it in a temporary Socketserver information storage area. The index page 624 script checks the socketserver 710 information storage area about once a second. If the script finds data in this storage area, it puts the form field information into the fields designated by the form field ID. The index script clears the socketserver 710 information storage area after it transfers the information to the display form.

6.5 Basic Host Routines

Figure 5:
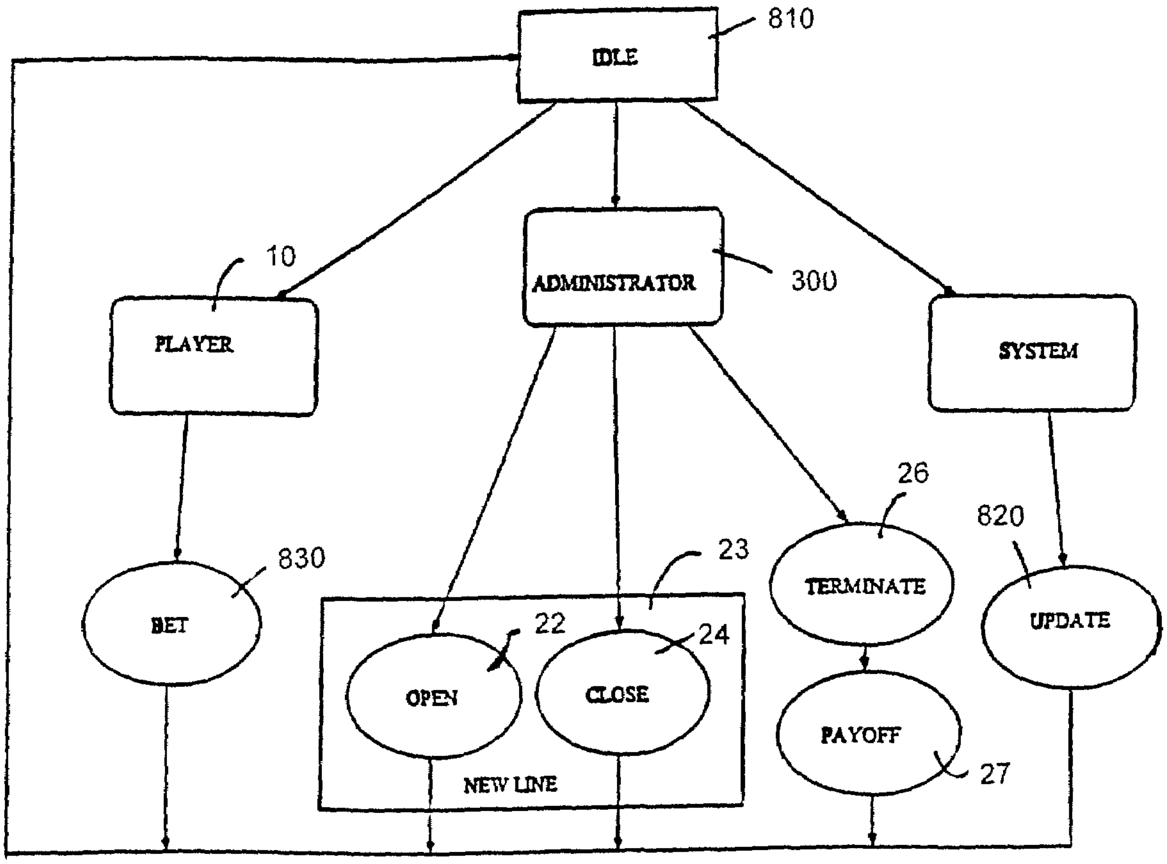
FIG. 5 is a block diagram representing basic host routines for the PBG.

FIG. 5 illustrates the basic software host routines 800. The host remains idle 810 until it gets one of the following interrupts:

update 820—This task is scheduled periodically (e.g., every 5 seconds). The host sends data to all the player processors 1010 and administrative processor 1300 clients reflecting changes to the screens 620 since the last update.

bet 830—When a player 10 places a bet, the relevant data (player identification, line identification, choice identification, and amount of the bet) is sent to the host 700. The host 700 makes appropriate changes to the PBG data base 900.

open 22—When the administrator 300 wants to open 22 a new line 20, the relevant data (betting event identification and (perhaps) bonus amount) is sent to the host 700. The host 700 opens 22 a new line 20.

close 24—When the administrator 300 wants to close 24 a line 20, the relevant data (line identification) is sent to the host 700. The host 700 closes 24 the line 20.

new line 23—This command closes the currently open line 20 and opens a new line 20 for the specified event 18.

terminate 26—When the administrator 300 wants to terminate 26 a line 20, the relevant data (line identification and winning choice identification) is sent to the host 700. All the non-terminated lines 20 (open 22 or closed 24) are terminated 26.

payoff 27—The host calculates all the winnings and losses for the players wagered on the just-terminated lines 26, and updates the PBG database.

6.6 Administrator Control Screen

Figure 6:
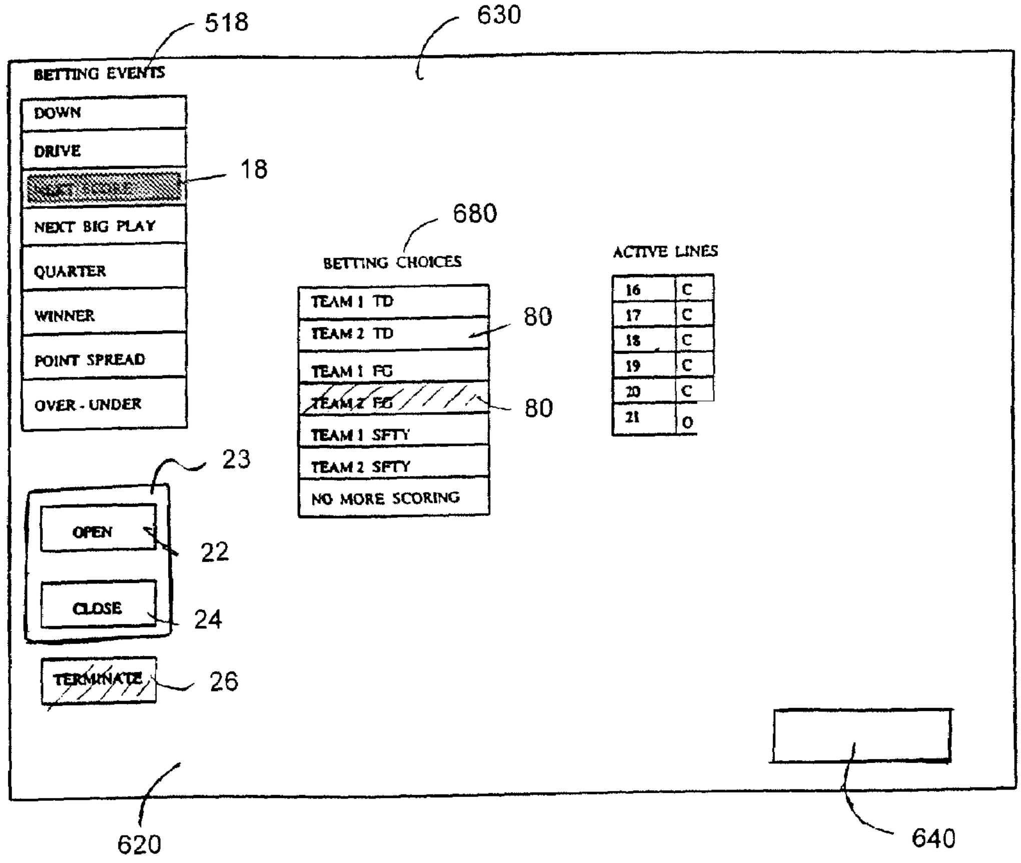
FIG. 6 is one preferred embodiment of an administrator control screen.

Every betting event 18 preferably has only one open line 22 at a time, and when the outcome of the betting event 18 becomes known, all the active lines 20 (open 22 and closed 24) terminate 26 at the same time. When betting events 18 have this property the administrator control screen 630 can take the form of cascading windows as illustrated in FIG. 6. The open 22 and close 24 functions can be combined into a new line function 23 (show in representational form in FIG. 6), which closes the currently open line 20 and opens a new line 20. The terminate 26 function terminates all the active lines 20 for the given betting event 18.

To perform a task, the administrator 300 first clicks on a betting event 18 (betting event "next-score" is highlighted in FIG. 6), which causes the choices new line 23 and terminate 26 to appear on the administrator control screen 630. If the administrator 300 clicks on terminate 26, then a list of betting choices 680 for the given betting event 18 appear. The administrator 300 then clicks on the winning choice 80 ("Team 2 FG" in this example) and the host 700 terminates all the currently active next-score lines 20 and pays off the players 10 with winning bets. If the administrator 300 had clicked on new line 23 then a window 630 would have appeared with choices for the bonus amount 30 for the new line 20. After clicking on a bonus amount 30, the host 700 would close 24 the currently open next score betting line 20 and open a new betting line 20 with the chosen bonus amount 30. A window 640 at the bottom of the screen in FIG. 6 can be used to send broadcast messages to the players 10. When the PBG game is based on a determinate sporting event, the foregoing administrator 300 functions can be built into the program, thus eliminating the human administrator 300.

6.7 Player Betting Screen

The players 10 use the betting screens 620 to observe the betting lines 20 and place bets. FIG. 7 shows an example of a player betting screen 650 that could serve that purpose. The screen shows one betting line 20 for each betting event 18 (the currently open lines by default). Each betting line 20 shows the betting choices 80 and bonus amount 30. For each betting choice the line shows the total bet 82 (so far) by all the players 10 on that choice (under "$"), the payoff odds 84 (defined as total bet on all the choices, plus the bonus, divided by the total bet on that choice), and the number of tokens 86 the player 10 has invested in that choice. Just below the betting lines are windows showing the line identification and its status 90. The player 10 can access other (e.g., previous) betting lines by clicking on "LINE #", for example to see how many tokens were bet on some of the previous lines 50 that are currently closed. There is also a window containing data like available 42 and frozen 44 assets for the player 10 and a list of opponent high scores 52. A window on the bottom for sending and/or receiving messages is also shown.

6.8 Random Clock

As shown in FIG. 7C, a random clock 27 provides a means of closing a betting line on a random basis. A random clock 27 can be used in either a determinate, indeterminate, or combination determinate/indeterminate version of the game. The random clock 27 can be a truly random clock 27 or a preprogrammed random clock 27. A truly random clock 27 is based on a random outcome. In most embodiments of the game, the random outcome will be generated by a random number generator function of a processor. The random clock 27 can be programmed in various ways, such as not to go off during a selected period of time after the betting line opens (e.g. one minute). The random clock 27 can be programmed to become increasingly more likely to go off as time goes on (e.g. a 1 percent chance of going off during the seconds 5-10 of the betting line, a 50 percent chance during seconds 10-30 of the betting line, a 75 percent chance during seconds 30-60 of the betting line, and 90 percent chance after 60 seconds of the betting line). Display features can be used to increase the drama created by the random clock 27. For example, a pair of dice 27 could roll periodically on the screen, as shown in FIG. 7C. If the dice land on a certain combination, the random clock 27 goes off, ending the betting line. A rolling dice or equivalent embodiment has the advantage of allowing players to time their bets between the rolls of the dice. Thus, a player who knows the correct answer might take a chance on placing his or her bet right before the dice complete their roll, or might even wait through a couple of rolls before placing the bet, in an attempt to keep the payoff on the current odds high.

The effect of a random clock 27 can be achieved by programming closing times into the game program. For example, if a PBG game is based on twenty questions, the closing time for each question can be predetermined and programmed into the processor. For difficult questions, the closing time might be longer, while for easy questions it might be shorter. Since none of the players know when each line will close, the effect is the same as having a truly random clock 27. A preprogrammed embodiment may be particularly effective when the game is used in conjunction with a replay of a determinate event. For example, if the determinate event is a replay of Super Bowl III, closing times can be programmed to coincide effectively with events that occurred during Super Bowl III.

6.9 Locked in Odds

Another embodiment of the invention is a locked-in odds version of the PBG. In a locked-in odds PBG, the total amount paid out to the winners will not (in general) be the same as the total wagered plus bonus minus house take. In a conventional PBG, players who place winning bets on a betting line get paid off at the "closing odds." In other words, the payoff odds are the odds on the choices at the time the line closed. This way all the tokens wagered on a line from the time it opens until the time is closes, plus the bonus (minus the house take in a casino version), are shared by the players with winning bets on that line.

In the locked-in odds version of the PBG, players make a "contract" with the house at the time of their bet that fixes the odds they receive if they win. In a preferred embodiment, when a player enters a bet on a betting screen a window appears with the following information: (1) choice ID; (2) amount of the bet; (3) odds offered on the choice; and (4) a confirm/cancel option. The player has a limited time to confirm the bet (say 15 seconds) or it is automatically cancelled. The odds offered by the house are calculated (via the formulas set forth herein) from the pools on the choices at the time of the bet, including the player's bet, so they will not be exactly the same as the posted odds just before the bet. In a casino version of the locked-in odds PBG, the house might offer odds lower than the parimutuel odds calculated from the formulas, as a precaution. In any case, when a player confirms a bet the odds offered by the house are "locked-in." If the player's bet is a winner, his net profit is (amount of bet)×(locked-in odds).

6.10 A Casino Sports betting Room for Playing PBG's

In many casinos there is an area devoted to sports betting. The sports betting area typically has numerous televisions showing live broadcasts of professional sporting events and closed circuit broadcasts or horse races. Bettors can spend the day at the casino, betting on games in the morning, watching them in the afternoon, and collecting their winnings later. They can make bets on horses throughout the day. These sports betting areas could be adapted to playing a PBG as follows:

1. Some TV screens are used to post the betting lines offered by the house. These screens would display the choices, odds, pools, bonuses (if any), and other information associated with the betting lines, and would be visible to everybody in the area.
2. Bettors place bets with a device provided by the house (the "betting device"). The betting device allows bettors to:
   (a) View the betting choices for each line offered by the house. (The odds and other information is publicly displayed on the TV monitors, so it does not need to be displayed on the betting device.)
   (b) Place bets by "clicking" on a choice and entering an amount.
   (c) View their current liquid and frozen asset totals.
   (d) View a list of the bets they have made with information on each, e.g. odds, status (pending or paid-off), winning choice, result (won or lost), and so on. A printed version of this information could be provided as well.

The bettor purchases tokens 40 from the house, which show up as liquid assets on the betting device. To "cash out" the bettor returns the device to the house. The house owes the player cash for the liquid assets only. The bettor receives a receipt for the bets still pending (to be cashed in later if he or she wins), as in other sports betting transactions. The house could charge players a premium for the tokens (e.g., $110 buys 100 tokens) and/or take a percentage of the betting action. The casino game is similar to the "sports bar" game described above. However, the casino game is unlikely to use the Internet, for security reasons.

7. Preferred Embodiment of a Computer Software Routine

FIGS. 9-13 present a functional block diagram of one preferred embodiment of a computer software routine for use in playing and administering the PBG of the invention 1 over the Internet 100. The computer software is programmed into and run from a host processor 200 (see FIG. 1), such that the host processor 200 is programmed for analyzing and processing input data and outputting data and information relevant to the PBG. As shown in FIGS. 1 and 3, a plurality of player processors 1010 are interactively connected to the host processor 200. The player processors 1010 are programmed for playing the PBG. Each player processor 1010 has a display means, such as a computer screen, operatively associated therewith for displaying data received from the host processor 200 and for entering data and sending data to the host processor 200. As shown in FIGS. 1 and 3, an administrative processor 1300 is interactively connected to the player processors 1010 via the host processor 200. The administrative processor 1300 is programmed for administering the PBG. The administrative processor 1300 has a display means operatively associated therewith for displaying data received from the host processor 200 and for entering data and sending data to the host processor 200. An administrator browser page is displayed on the display means of the administrative processor 1300. A player browser page is displayed on the display means of each player processor 1010.

Prior to commencement of the sporting event, the administrator 300 and a plurality of players 10 log into the software host routines 700 of the host processor 200. The administrator 300, using the administrative processor 1300, instructs the host processor 200 to begin the PBG 1100, such as by selecting the type of sporting event. The host processor 200 electronically allocates betting tokens 40 to each of the players 10 prior to commencement of the sporting event. The token 40 allocation can be calculated and made automatically by the host processor 200. In an alternative embodiment, the amount of the token 40 allocation can be selected by the administrator 300. Players 10 will typically receive an equal allocation of tokens 40. However, when the PBG is played using tokens 40 having real monetary value, each player 10 may be allowed to buy as many tokens as he or she desires.

After the tokens 40 have been allocated to the players 10, the software host 700 waits for commands 1110 from the player processors 1010 and administrative processor 1300, which commands 1110 will be received through the socket server 710 in the manner described above. The players 10 and the administrator 300 use the browser pages 622 (including the administrator control screen 630 and the player betting screen 650) and the processors 200, 1010, 1300 to conduct a plurality of betting events 18. After commencement of the sporting event, the administrator 300 monitors the sporting event for situations giving rise to bettable events 18. Using the administrator control screen 630, the administrator 300 selects the betting events 18 that the players 10 will be allowed to bet on during the PBG. The administrator 300 also uses the administrator control screen 630 on the administrative browser 1300 to open a betting line 20 for the selected betting event 18. Betting lines 20 in some betting events 18, such as "Winner of Game," can be opened before the sporting event begins.

Figure 9:
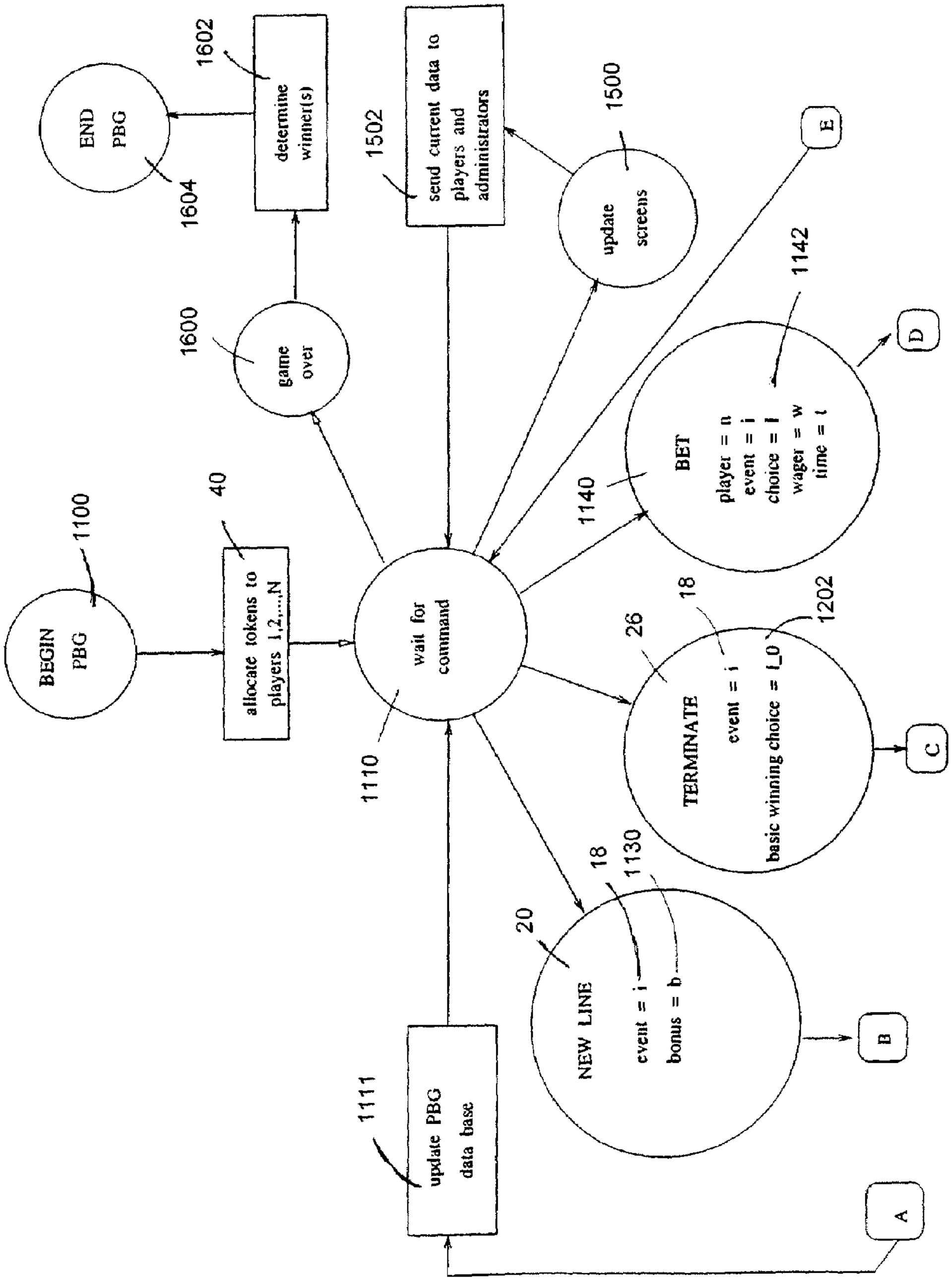
FIG. 9 is a functional block diagram showing computer software that implements the functions of parimutuel betting game.
Figure 10:
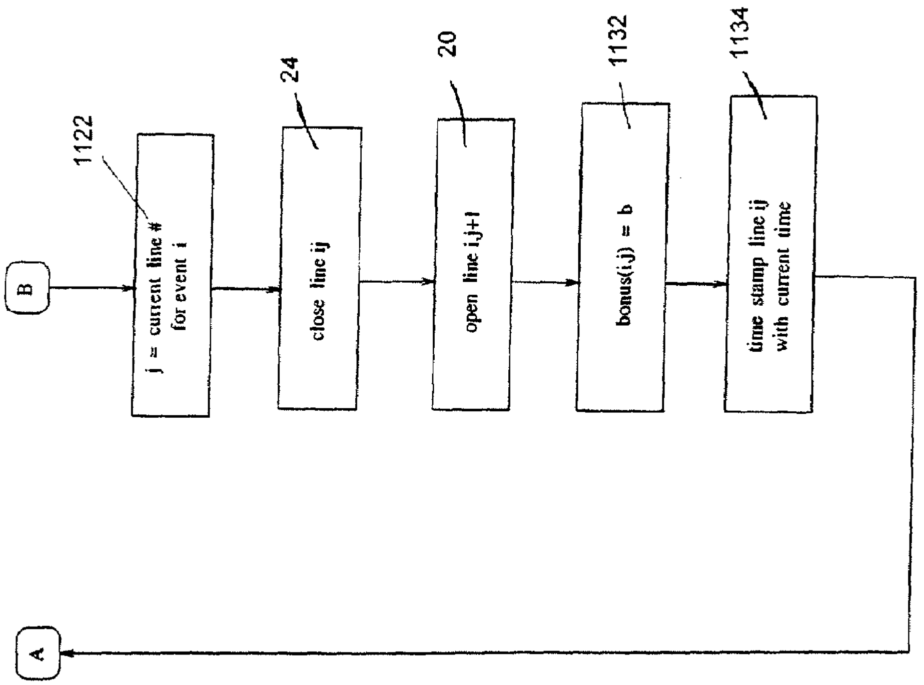
FIG. 10 is a functional block diagram showing computer software that implements a routine for opening a new betting line in the parimutuel betting game.

As shown in FIGS. 9 and 10, when the administrator 300 opens a new betting line 20, the administrative processor 1300 sends a command consisting of a betting line identifier 1122 and a bonus amount 1130 for the new line 20 to the host processor 200. Upon receiving the command 1110 with the betting line identifier 1122 for the new line 20, the host processor opens a new betting line 20, as shown in FIG. 9. Betting event information for the open betting line 20 is displayed on the display means of the player processors 1010. FIG. 10 shows a software program routine for administering a betting line 20. Once opened, the betting line 20 remains open until the administrator 300 closes 24 the line 20. Updated betting information for each betting line is displayed on the player browser pages 650. After a selected interval, the administrator 300 closes the betting line such that no further tokens 40 may be bet on the line 20. When the administrator 300 closes the line 20, the administrative processor 1300 sends the line identifier 1122 for the new line to the host processor 200. Upon receiving the betting line identifier 1122, the host closes the new betting line such that no further bets can be placed on the line 20. Upon closure of the prior betting line 20, the browser 200 opens a new betting line 20, processes the bonus 1132 on the closed betting line 20, and time stamps 1134 the closed betting line 20 so that no further bets can be placed on the closed betting line 20. The software program then updates the PBG database, as shown in the loop back to FIG. 9.

Figure 12:
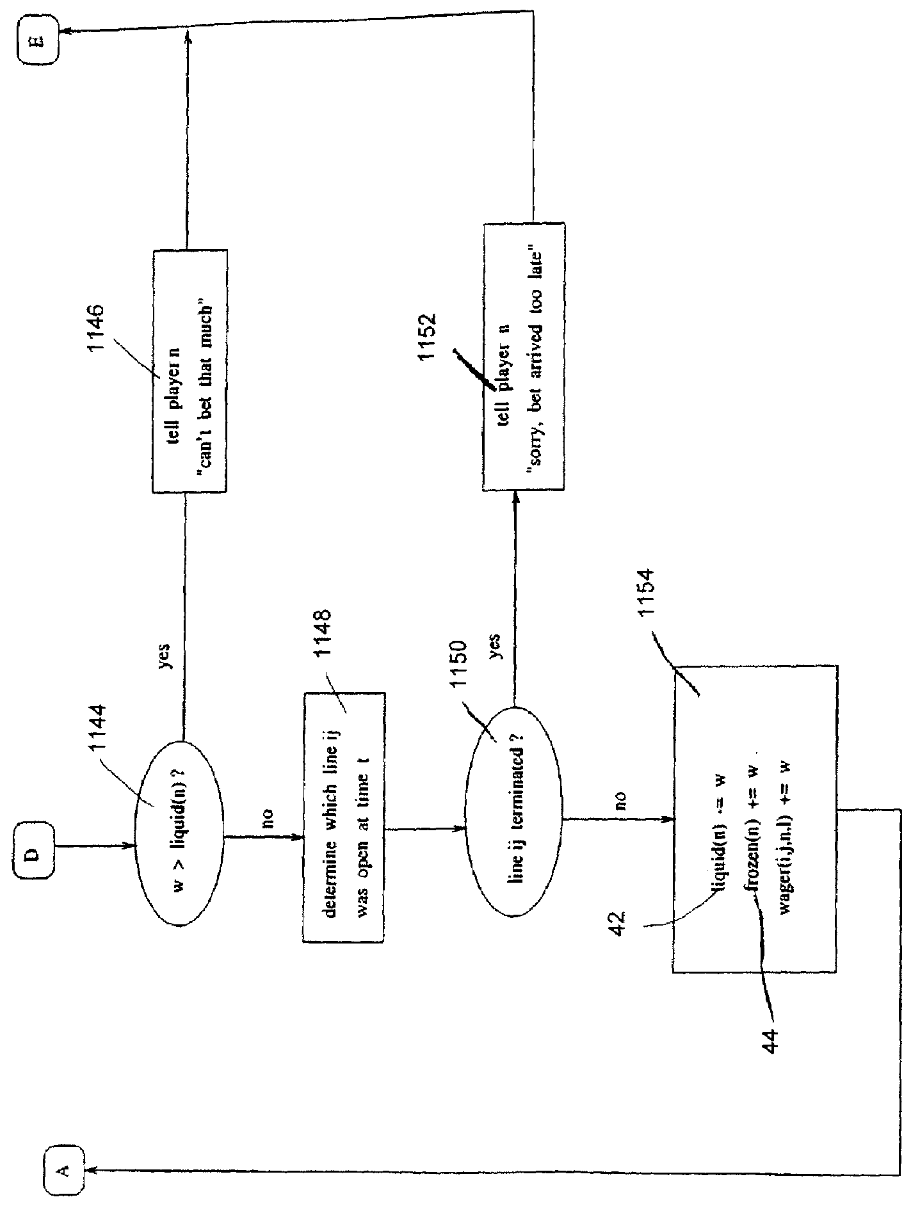
FIG. 12 is a functional block diagram showing computer software that implements a routine for placing bets in a betting line in the parimutuel betting game.

FIGS. 9 and 12 show a software program for processing a bet 1140 placed on an open betting line 20. The players 10 are allowed an amount of time within which to use the player browser pages 622 to selectively bet tokens 40 on the possible outcomes of the betting event 18. For each bet placed by a player 10 on a betting line 20, data 1142 concerning the bet is sent to the host computer for processing. As shown in FIG. 9, the data includes a player identification n, a betting line identification i, a betting choice identification l, an amount bet w, and the time t of the bet. Tokens 40 bet on the open betting line 20 are frozen 44 such that the frozen tokens 44 are not available for further betting until a payoff has been made on the betting event. When a bet is received by the host processor 200, the software program first checks to see whether the amount of the wager w is greater than the amount of the betting player's liquid (i.e. available) tokens 42. If the amount bet is greater than the amount of the betting player's liquid tokens 42, the host processor 200 sends the betting player 10 a command such as "Can't Bet That Much" 1146, in which case the bet is not processed. If the player has sufficient liquid tokens, the software program then checks to make sure that the bet was received while the betting line was open, which includes determining which line was open at time t 1148 and whether the line was terminated at time t 1150. If the betting line was already closed at the time the bet was placed, the host processor 200 sends the betting player 10 a command such as "Sorry, Bet Arrived Too Late," in which case the bet is not processed. If the bet was placed before the betting line closed, the bet is processed 1154. The amount of the bet w is subtracted from the betting player's liquid tokens 42, and the amount of the bet is added to the betting player's frozen tokens 44. The software program then updates the PBG database 1111, as shown in the loop back to FIG. 9.

Figure 11:
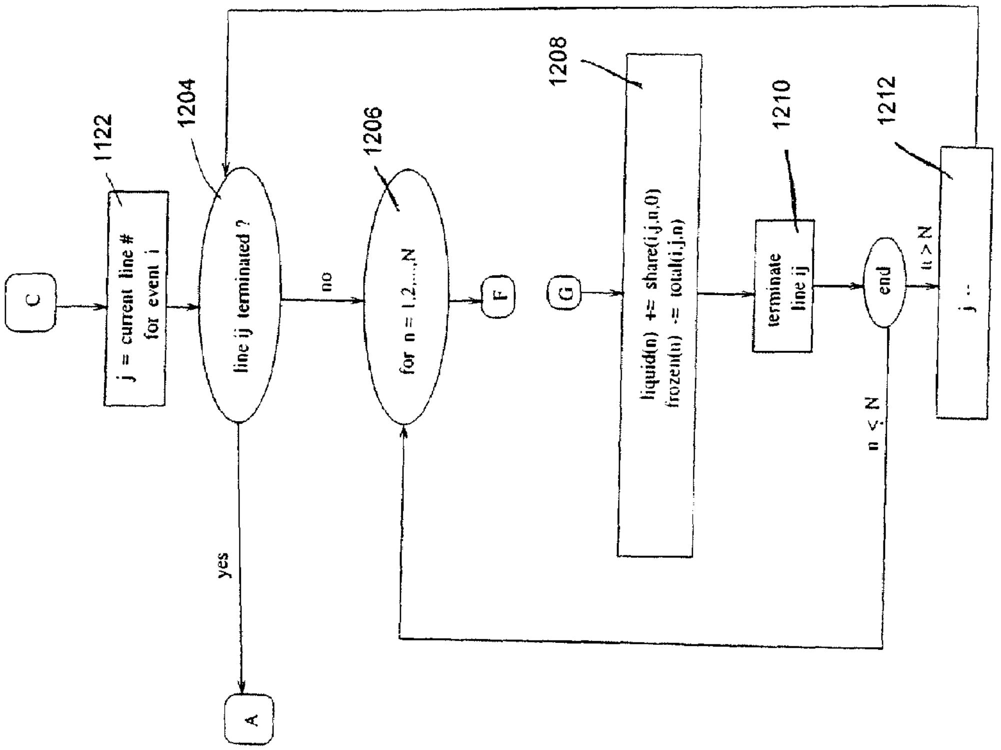
FIG. 11 is a functional block diagram showing computer software that implements a routine for terminating a betting line in the parimutuel betting game.
Figure 13:
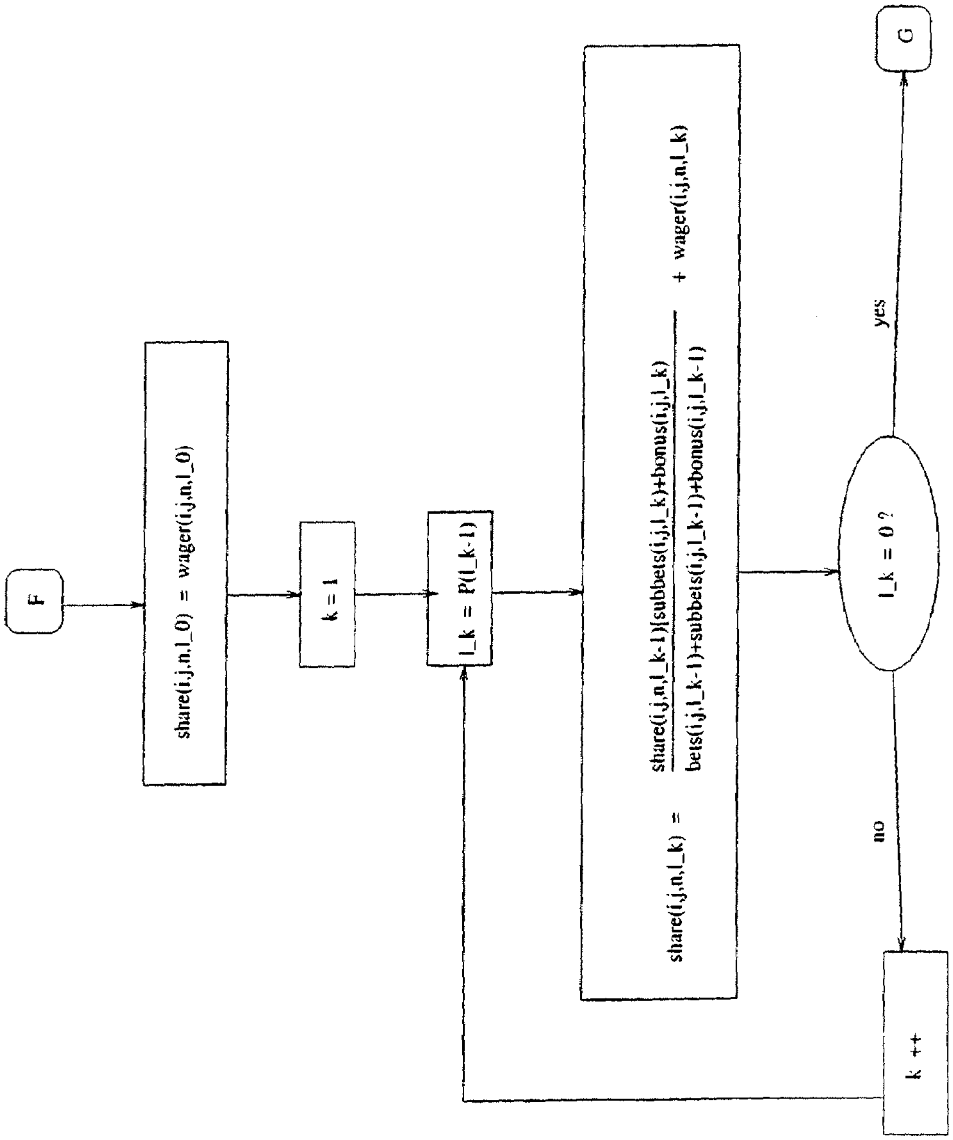
FIG. 13 is a functional block diagram showing computer software that implements a routine for calculating player payoffs on a terminated betting line in the parimutuel betting game.

FIGS. 9, 11, and 13 together show a software program routine for terminating betting lines and administering parimutuel style payoffs. As discussed above, the administrator 300 monitors the sporting event until a termination event occurs with regard to the betting event 18. The administrator 300 terminates 26 the betting event 18 upon occurrence of the termination event for the betting event 18. When the administrator 300 terminates 26 the betting event, the administrative processor 1300 sends the line identifier 1122 and a winning choice identification 1202 to the host processor 200 for calculating the parimutuel payoff on the betting lines 20. Upon termination of the betting event, winners of each betting line 20 in the betting event 18 are paid off in parimutuel style, with the payoffs being determined and processed by the host processor 200. The betting event 18 can be terminated by inputting basic winning choice $l_0$ for the betting event 18. As shown in FIG. 11, the host processor 200 checks each current line ji in the betting event 18 to determine whether each particular betting line ij has been terminated 1204. If the betting line ij has been terminated, the processor 200 updates the PBG database 1111, as shown in the loop back to FIG. 9. If the betting line ij has not been terminated, the processor then loops through each of the players n=1, 2, . . . N as shown in block 1206 to calculate parimutuel shares for each player 10. The software program subroutine shown in FIG. 13 provides a means for determining payoffs for hierarchical choice sets that retains the flavor of a parimutuel style. Each hierarchical payoff in the hierarchical betting event is determined through stepwise application of a recursive algorithm to the hierarchical payoff tree structure, in the manner described above in Section 4. For each player 10, the subroutine of FIG. 13 works down the hierarchical tree from the basic winning choice $l_0$, looping through the routine until $l_k$=0. When $l_k$=0, the processor 200 adjusts the liquid 42 and frozen 44 assets of the player 10 in accordance with the hierarchical parimutuel payoff, as shown in block 1208. The processor 200 then terminates line ij for that particular player. If payoffs for any player 10 remain uncalculated for the given betting line ij, the processor 200 loops back up to calculate the payoff for the next player 10, as shown in block 1208. Once payoffs have been calculated and distributed for each player 10 in line ij, the processor 200 updates the PBG database 1111, as shown in FIG. 9.

As shown in block 1500 of FIG. 9, the processor 200 periodically updates screens 1500 of the processors 1010, 1300. As shown in block 1502 of FIG. 9, the processor 200 also periodically sends current data to players 10 and administrators 300. The process of selectively conducting betting events 18 is repeated until the conclusion of the sporting event. As shown in FIG. 9, when the game is over 1600 at the conclusion of the sporting event, the winner is determined 1602. The PBG software program is then terminated 1604.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A method of playing a parimutuel betting game between a plurality of players, the parimutuel betting game based on events unfolding during a determinate sporting event, such as a trivia game, a principal objective of the game being to acquire the largest number of betting tokens by the end of the sporting event, wherein the players are in direct competition because payoffs are parimutuel style, comprising:

allocating betting tokens to each of the players, conducting a plurality of betting events, each said betting event based on a bettable event occurring during said determinate sporting event, each said step of conducting a betting event comprising:

selecting a betting event from said bettable event;

administering at least one betting line for said betting event, each said step of administering a betting line comprising:

opening a betting line for said betting event, said betting line based on a finite set of possible outcomes of said betting event;

allowing the players to selectively bet tokens on said possible outcomes of said betting event;

freezing tokens bet on said open betting line such that said frozen tokens are not available for further betting until a payoff has been made on said betting event;

closing said betting line after a selected interval such that no further tokens may be bet on said line;

terminating said betting event; and upon termination of said betting event, paying off winners of each said betting line in said betting event in parimutuel style.

2. The method of claim 1, further comprising allocating bonus tokens to each said open betting line to thereby encourage the players to bet on said open line, said bonus tokens being paid to winners of said betting line in parimutuel style.

3. The method of claim 1, wherein for each said betting event, only one betting line is open at any given time, to thereby encourage the players to bet on a given betting line before said betting line closes.

4. The method of claim 3, wherein a new betting line is opened substantially whenever a prior betting line closes, to thereby constantly challenge the players to evaluate an open betting line within said betting event.

5. The method of claim 1, wherein each of the players can place multiple bets on any open betting line.

6. The method of claim 1, further comprising allocating additional tokens to each of the players at selected intervals during the game.

7. The method of claim 6, wherein each of the players receive an equal amount of said additional tokens.

8. The method of claim 1, wherein at least one of said betting events has a hierarchal parimutuel style payoff tree structure, said hierarchical parimutuel style payoff tree structure comprising:

said hierarchical betting event having at least two primary outcomes, at least one of said primary outcomes in said hierarchical betting event having at least two secondary outcomes, such that whenever one of said secondary outcomes is a winning bet, one of said primary outcomes is also a winning bet, and wherein winning bets placed on said secondary outcomes receive a higher parimutuel style payoff than winning bets placed on said primary outcomes.

9. The method of claim 8, wherein at least one of said secondary outcomes in said hierarchical betting event has at least two tertiary outcomes, such that whenever one of said tertiary outcomes is a winning bet, one of said secondary outcomes and one of said primary outcomes are also a winning bet, and wherein winning bets placed on said tertiary outcomes receive a higher parimutuel style payoff than winning bets placed on said secondary outcomes.

10. The method of claim 9, wherein at least one of said tertiary outcomes in said hierarchical betting event has at least two quaternary outcomes, such that whenever one of said quaternary outcomes is a winning bet, one of said tertiary outcomes, one of said secondary outcomes, and one of said primary outcomes are also a winning bet, and wherein winning bets placed on said quaternary outcomes receive a higher parimutuel style payoff-than winning bets placed on said tertiary outcomes.

11. The method of claim 8, wherein each said hierarchical payoff in said hierarchical betting event is share(n, $1_m$) determined through step-wise application of a recursive algorithm to said hierarchical payoff tree structure, said recursive algorithm being $$\text{share}(n,l_k)=[\text{share}(n,l_{k-1})[\text{subbets}(l_k))+\text{Bonus}(l_k)]]) [\text{bets}(l_{k-1})+\text{subbets}(l_{k-1})+\text{Bonus}(l_{k-1})]+\text{wager}(n, l_k)$$

wherein $1_k$ is the outcome whose sub-outcome is $1_{k-1}$, k takes values 1, 2, 3 . . . m, m is the number of branches outcome to is from a base of the hierarchical payoff tree structure, $1_0$ is the winning outcome that is a leaf of the hierarchical payoff tree structure, n=player placing bet, subbets($1_k$)=total number of tokens bet on subbets of $1_k$, bets($1_k$)=total tokens bet on $1_k$ itself, wager(n, $1_k$)=total tokens bet on $1_k$ by player n, share(n, $1_0$)=wager(n, $1_0$) and Bonus(l)=bonus(l) if subbet(l)>0 and 0 if subbet($1_0$)=0.

12. The method of claim 1, further comprising a means for determining payoffs for hierarchical choice sets that retains the flavor of a parimutuel style.

13. The method of claim 1, wherein the players pay money to a gambling establishment in exchange for said allocation of tokens.

14. The method of claim 13, wherein said gambling establishment retains a percentage of tokens bet on said betting lines.

15. The method of claim 1, wherein each said betting event is a Trivia Event Betting Line.

16. The method of claim 1, wherein some of said betting events are Trivia Event Betting Lines and some of said betting events are Viewed Event Betting Lines.

17. The method of claim 16, wherein some of said Viewed Event Betting Lines are determinate.

18. The method of claim 16, wherein some of said Viewed Event Betting Lines are indeterminate.

19. A computerized method of playing a parimutuel betting game between a plurality of players, said parimutuel betting game based on events unfolding during a determinate sporting event, such as a trivia game, a principal objective of the game being to acquire the largest number of betting tokens by the end of the sporting event, wherein the players are in direct competition with each other because each player's winnings come from other players' losses, the game being administered by an administrator, comprising:

providing a host processor, said host processor programmed for analyzing and processing input data and outputting data and information relevant to the parimutuel betting game;

interactively connecting a plurality of player processors to said host processor, said player processors programmed for playing the parimutuel betting game, each said player processor having a display means operatively associated therewith for displaying data received from said host processor and for entering data and sending data to said host processor;

interactively connecting an administrative processor to said player processors via said host processor, said administrative processor programmed for administering the parimutuel betting game, said administrative processor having a display means operatively associated therewith for displaying data received from said host processor and for entering data and sending data to said host processor;

displaying an administrator browser page on said display means of said administrative processor;

displaying a player browser page on said display means of each said player processor;

using said processors to allocate betting tokens to each of the players prior to commencement of said sporting event;

the administrator monitoring said sporting event for situations giving rise to bettable events;

the players and the administrator using said browser pages and said processors to conduct a plurality of betting events, each said betting event based on a bettable event occurring during said sporting event, each said step of conducting a betting event comprising:

the administrator selecting a betting event from said bettable events;

administering at least one betting line for said betting event, each said step of administering a betting line comprising:

the administrator using said administrative browser page to open a betting line for said betting event, said betting line based on a finite set of possible outcomes of said betting event;

upon the administrator opening a new betting line, said administrative processor sending a betting line identifier and a bonus amount for said new line to said host processor;

upon receiving said betting line identifier for said new line, said host processor opening a new betting line;

displaying betting event information for said open betting line on said display means of said player processors, allowing the players an amount of time within which to use said player browser pages to selectively bet tokens on said possible outcomes of said betting event;

for each bet placed by a player on a betting line, sending data concerning said bet to said host computer for processing, said data including a player identification, a betting line identification, a betting choice identification, and an amount bet;

freezing tokens bet on said open betting line such that said frozen tokens are not available for further betting until a payoff has been made on said betting event;

displaying updated betting event information for each said betting line on said player browser pages;

the administrator closing said betting line after a selected interval such that no further tokens may be bet on said line;

upon the administrator closing said new line, said administrative processor sending said line identifier for said new line to said host processor;

upon receiving said betting line identifier, said host closing said new betting line such that no further bets can be placed on said line;

the administrator monitoring said sporting event until a termination event occurs with regard to said betting event;

terminating said betting event upon occurrence of said termination event for said betting event;

upon the administrator terminating said betting event for said new line, said administrative processor sending said line identifier and a winning choice identification to said host processor for calculating said parimutuel payoff on said new line;

upon termination of each said betting event, paying off winners of each said betting line in said betting event in parimutuel style, said payoffs being determined and processed by said host processor;

performing updates on a periodic basis wherein said host processor sends data to all the player processors and said administrative processor reflecting changes to said browser pages; and repeating said process of selectively conducting betting events until the sporting event has concluded.

20. The method of claim 19, further comprising, prior to a start of said game, said administrator selecting possible betting events to be used during the game, and said administrator selecting bonus amounts to be awarded for each betting line in a given betting event.

21. The method of claim 19, wherein said displayed betting event information for each said betting line is selected from the group consisting of: betting line identification, bonus amount, betting choices in said line, total tokens bet on each betting choice in said line, number of tokens the player using said player processor has bet on each betting choice in said line, payoff odds, and status of betting line.

22. The method of claim 19, wherein said open and close functions are combined into a new line function, such that selecting said new line function closes said open line and opens a new line.

23. The method of claim 19, wherein a subset of the players may elect to play the parimutuel betting game in a private group consisting only of said subset of players, said private group being administered by the administrator.

24. The method of claim 23, wherein said private group selectively customizes a set of house rules for said private group prior to commencement of said sporting event.

25. The method of claim 24, wherein said customized house rules for said private group are selected via a captain's browser page on one of said remote terminals, said captain's browser page containing input fields for setting up said private game for said private group, said input fields of said captain's screen including a list of the players of said private group, a list of betting events, a default bonus size for said betting lines, and an allocation of tokens to be distributed to the players at selected points in the sporting event.

26. The method of claim 19, wherein said host processor simultaneously runs a plurality of parimutuel betting games, each of the parimutuel betting games being based on a separate sporting event, and further comprising, for each of the parimutuel betting games, assigning identification numbers to the administrator for and the players of the game, said processor using said identification numbers to ensure that the players are linked to the appropriate administrator of that particular game.

27. The method of claim 19, wherein said host processor, said player processor, and said administrative processor interact via the Internet.

28. The method of claim 27, wherein at least some of said player processors are connected to said host processor via a wireless Internet connection means.

29. The method of claim 19, further comprising allocating bonus tokens to each said open betting line to thereby encourage the players to bet on said open line, said bonus tokens being paid to winners of said betting line in parimutuel style such that bonus tokens on said line are allocated among said winners according to each said winner's proportion of winning bets on said line.

30. The method of claim 19, wherein for each said betting event, only one betting line is open at any given time, to thereby encourage the players to bet on a given betting line before said betting line closes.

31. The method of claim 30, wherein a new betting line is opened substantially whenever a prior betting line closes, to thereby constantly challenge the players to evaluate an open betting line within said betting event.

32. The method of claim 19, wherein each of the players can place multiple bets on any open betting line.

33. The method of claim 19, further comprising allocating additional tokens to each of the players at selected intervals during the game.

34. The method of claim 33, wherein each of the players receive an equal amount of said additional tokens.

35. The method of claim 19, wherein at least one of said betting events has a hierarchal parimutuel style payoff tree structure, said hierarchical parimutuel style payoff tree structure comprising:

said hierarchical betting event having at least two primary outcomes, at least one of said primary outcomes in said hierarchical betting event having at least two secondary outcomes, such that whenever one of said secondary outcomes is a winning bet, one of said primary outcomes is also a winning bet, and wherein winning bets placed on said secondary outcomes receive a higher parimutuel style payoff than winning bets placed on said primary outcomes.

36. The method of claim 35, wherein at least one of said secondary outcomes in said hierarchical betting event has at least two tertiary outcomes, such that whenever one of said tertiary outcomes is a winning bet, one of said secondary outcomes and one of said primary outcomes are also a winning bet, and wherein winning bets placed on said tertiary outcomes receive a higher parimutuel style payoff than winning bets placed on said secondary outcomes.

37. The method of claim 36, wherein at least one of said tertiary outcomes in said hierarchical betting event has at least two quaternary outcomes, such that whenever one of said quaternary outcomes is a winning bet, one of said tertiary outcomes, one of said secondary outcomes, and one of said primary outcomes are also a winning bet, and wherein winning bets placed on said quaternary outcomes receive a higher parimutuel style payoff than winning bets placed on said tertiary outcomes.

38. The method of claim 35, wherein each said hierarchical payoff in said hierarchical betting event is share(n, $l_m$) determined through step-wise application of a recursive algorithm to said hierarchical payoff tree structure, said recursive algorithm being $$\text{share}(n,l_k)=[\text{share}(n,l_{k-1})[\text{subbets}(l_k))+\text{Bonus}(l_k)]]) [\text{bets}(l_{k-1})+\text{subbets}(l_{k-1})+\text{Bonus}(l_{k-1})]+\text{wager}(n, l_k)$$

wherein $l_k$ is the outcome whose sub-outcome is $l_{k-1}$, k takes values 1, 2, 3 . . . m, m is the number of branches outcome to is from a base of the hierarchical payoff tree structure, to is the winning outcome that is a leaf of the hierarchical payoff tree structure, n=player placing bet, subbets($l_k$)=total number of tokens bet on subbets of $l_k$, bets($l_k$)=total tokens bet on $l_k$ itself, wager(n, $l_k$)=total tokens bet on $l_k$ by player n, share(n, $l_0$)=wager(n, $l_0$) and Bonus(l)=bonus(l) if subbet(l)>0 and 0 if subbet($l_0$)=0.

39. The method of claim 19, further comprising a means for determining payoffs for hierarchical choice sets that retains the flavor of a parimutuel style.

40. The method of claim 19, wherein said selected sporting event is a trivia game.

41. The method of claim 19, wherein the players pay money to a gambling establishment in exchange for said allocation of tokens.

42. The method of claim 41, wherein said gambling establishment retains a percentage of tokens bet on said betting lines.

43. The method of claim 19, wherein each said betting event is a Trivia Event Betting Line.

44. The method of claim 19, wherein some of said betting events are Trivia Event Betting Lines and some of said betting events are Viewed Event Betting Lines.

45. The method of claim 44, wherein some of said Viewed Event Betting Lines are determinate.

46. The method of claim 44, wherein some of said Viewed Event Betting Lines are indeterminate.

47. A system for playing a parimutuel betting game between a plurality of players, the parimutuel betting game based on events unfolding during a determinate sporting event, such as a trivia game, a principal objective of the game being to acquire the largest number of betting tokens by the end of the sporting event, wherein the players are in direct competition with each other because each player's winnings come from other players' losses, the game being administered by an administrator, comprising:

a host processor programmed for analyzing and processing input data and outputting data and information relevant to the parimutuel betting game;

a plurality of player processors interactively connected to said host processor, said player processors programmed for playing the parimutuel betting game;

an administrative processor interactively connected to said player processors via said host processor, said administrative processor programmed for administering the game based on input from the administrator;

a display means operatively associated with each said player processor for displaying data received from said host processor, and for entering data and sending data to said host processor;

a display means operatively associated with each said administrative processor for displaying data received from said host processor, and for entering data and sending data to said host processor, said processors programmed to:

allocate betting tokens to each said player processor;

open and conduct a plurality of betting events, each said betting event based on a bettable event occurring during said sporting event, said betting events being selectable by the administrator;

open a plurality of betting lines for each said bettable events, each said betting line based on a finite set of possible outcomes of said betting event, said betting lines being selectable by the administrator;

receive and process bets of tokens placed by the players on said possible outcomes of said betting event on each betting line opened during the game;

freeze tokens bet on each said open line such that said frozen tokens are not available for further betting until a payoff has been made on said betting event;

close each said open betting line after a selected interval, said interval being selected by the administrator, such that no further tokens may be bet on said line;

terminate said betting event upon occurrence of a termination event for said betting event;

upon termination of said betting event, payoff winners of each said betting line in said betting event in parimutuel style.

48. The system of claim 47, wherein said host processor includes an interrupt processing means for processing interrupts received from said processors, said interrupts being selected from the group consisting of update, bet, open, close, and terminate.

49. The system of claim 47, further comprising:

said host processor having a web server means for downloading interface screens to said player processors and said administrative processor;

said host processor having a bookkeeping means for processing all bookkeeping functions required by said host processor;

said host processor having a parimutuel betting game database means for holding login information for each of the players; and said host processor having a real-time processing loop means for supplying socket-based real time communications between said player processors, said administrative processor, and said bookkeeping means.

50. The system of claim 47, further comprising:

said processors programmed to allocate bonus tokens to each said open betting line to thereby encourage the players to bet on said open line, said bonus tokens being paid to winners of said betting line in parimutuel style such that bonus tokens on said line are allocated among said winners according to each said winner's proportion of winning bets on said line.

51. The system of claim 47, further comprising:

said processors programmed to conduct only one open betting line at a time in each conducted betting event, to thereby encourage the players to bet on a given betting line before said betting line closes.

52. The system of claim 51, wherein a new betting line is opened substantially whenever a prior betting line closes, to thereby constantly challenge the players to evaluate an open betting line within said betting event.

53. The system of claim 47, wherein each of the players can place multiple bets on any open betting line.

54. The system of claim 47, further comprising allocating additional tokens to each of the players at selected intervals during the game.

55. The system of claim 54, wherein each of the players receive an equal amount of said additional tokens.

56. The system of claim 47, wherein at least one of said betting events has a hierarchal parimutuel style payoff tree structure, said hierarchical parimutuel style payoff tree structure comprising:

said hierarchical betting event having at least two primary outcomes, at least one of said primary outcomes in said hierarchical betting event having at least two secondary outcomes, such that whenever one of said secondary outcomes is a winning bet, one of said primary outcomes is also a winning bet, and wherein winning bets placed on said secondary outcomes receive a higher parimutuel style payoff than winning bets placed on said primary outcomes.

57. The system of claim 56, wherein at least one of said secondary outcomes in said hierarchical betting event has at least two tertiary outcomes, such that whenever one of said tertiary outcomes is a winning bet, one of said secondary outcomes and one of said primary outcomes are also a winning bet, and wherein winning bets placed on said tertiary outcomes receive a higher parimutuel style payoff than winning bets placed on said secondary outcomes.

58. The system of claim 57, wherein at least one of said tertiary outcomes in said hierarchical betting event has at least two quaternary outcomes, such that whenever one of said quaternary outcomes is a winning bet, one of said tertiary outcomes, one of said secondary outcomes, and one of said primary outcomes are also a winning bet, and wherein winning bets placed on said quaternary outcomes receive a higher parimutuel style payoff than winning bets placed on said tertiary outcomes.

59. The system of claim 57, wherein each said hierarchical payoff in said hierarchical betting event is share(n, $l_m$) determined through step-wise application of a recursive algorithm to said hierarchical payoff tree structure, said recursive algorithm being $$\text{share}(n,l_k)=[\text{share}(n,l_{k-1})\ [\text{subbets}(l_k))+\text{Bonus}(l_k)]])\ [\text{bets}(l_{k-1})+\text{subbets}(l_{k-1})+\text{Bonus}(l_{k-1})]+\text{wager}(n,l_k)$$

wherein $l_k$ is the outcome whose sub-outcome is $l_{k-1}$, k takes values 1, 2, 3 . . . m, m is the number of branches outcome to is from a base of the hierarchical payoff tree structure, $l_0$ is the winning outcome that is a leaf of the hierarchical payoff tree structure, n=player placing bet, subbets($l_k$)=total number of tokens bet on subbets of $l_k$, bets($l_k$)=total tokens bet on $l_k$ itself, wager(n, $l_k$)=total tokens bet on $l_k$ by player n, share(n, $l_0$)=wager(n, $l_0$) and Bonus(l)=bonus(l) if subbet(l)>0, and 0 if subbet($l_0$)=0.

60. The system of claim 47, further comprising: a means for determining payoffs for hierarchical choice sets that retains the flavor of a parimutuel style.

61. The system of claim 47, wherein the players pay money to a gambling establishment in exchange for said allocation of tokens.

62. The system of claim 61, wherein said gambling establishment retains a percentage of tokens bet on said betting lines.

63. The method of claim 47, wherein at least some of said lines open at random points in time so as to add uncertainty as to when a line will close and thereby provide an incentive to place bets early in a given betting line.

64. The method of claim 47, wherein each said betting event is a Trivia Event Betting Line.

65. The method of claim 47, wherein some of said betting events are Trivia Event Betting Lines and some of said betting events are Viewed Event Betting Lines.

66. The method of claim 65, wherein some of said Viewed Event Betting Lines are determinate.

67. The method of claim 65, wherein some of said Viewed Event Betting Lines are indeterminate.

* * * * *